United States Patent
Palanki et al.

(10) Patent No.: US 9,419,676 B2
(45) Date of Patent: Aug. 16, 2016

(54) PILOT TRANSMISSION AND CHANNEL ESTIMATION FOR A COMMUNICATION SYSTEM UTILIZING FREQUENCY DIVISION MULTIPLEXING

(75) Inventors: Ravi Palanki, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/366,727

(22) Filed: Feb. 6, 2012

(65) Prior Publication Data

US 2012/0188994 A1    Jul. 26, 2012

Related U.S. Application Data

(62) Division of application No. 11/175,607, filed on Jul. 5, 2005, now Pat. No. 8,135,088.

(60) Provisional application No. 60/659,526, filed on Mar. 7, 2005.

(51) Int. Cl.
  *H04B 1/69*     (2011.01)
  *H04L 27/26*    (2006.01)
  (Continued)

(52) U.S. Cl.
  CPC ............... *H04B 1/69* (2013.01); *H04L 25/023* (2013.01); *H04L 25/025* (2013.01);
  (Continued)

(58) Field of Classification Search
  CPC ...... H04B 1/69; H04L 25/023; H04L 25/025; H04L 27/2613; H04L 2025/03624; H04L 25/0212; H04L 25/022; H04L 5/0007; H04L 5/0048

USPC .................................. 375/260, 267, 316, 340
See application file for complete search history.

(56) References Cited

U.S. PATENT DOCUMENTS

| | | | |
|---|---|---|---|
| 5,274,627 A | 12/1993 | De Santis | |
| 7,065,371 B1 * | 6/2006 | Kleinerman | ............. 455/464 |

(Continued)

FOREIGN PATENT DOCUMENTS

| | | |
|---|---|---|
| AU | 2005319084 | 4/2010 |
| CL | 19972317 | 10/1997 |

(Continued)

OTHER PUBLICATIONS

3GPP TSG RAN WG1 Ad Hoc on LTE, LG Electronics, Uplink Multiple Access scheme, Jun. 20-21, 2005.*

(Continued)

*Primary Examiner* — Freshteh N Aghdam
(74) *Attorney, Agent, or Firm* — Ke Liu

(57) ABSTRACT

A receiver for receiving a pilot generated based on a polyphase sequence having a constant time-domain envelope and a flat frequency spectrum is disclosed. In one design, the receiver includes at least one demodulator and at least one processor. The demodulator(s) receive at least one single-carrier frequency division multiple access (SC-FDMA) symbol transmitted via a communication channel and including pilot symbols generated based on a polyphase sequence. The demodulator(s) remove a cyclic prefix in each SC-FDMA symbol and demodulate the at least one SC-FDMA symbol to obtain received pilot symbols. The processor(s) derive a channel estimate for the communication channel based on the received pilot symbols.

24 Claims, 14 Drawing Sheets

(51) Int. Cl.
  *H04L 5/00* (2006.01)
  *H04L 25/02* (2006.01)
  *H04L 25/03* (2006.01)

(52) U.S. Cl.
  CPC .......... *H04L 27/2613* (2013.01); *H04L 5/0007* (2013.01); *H04L 5/0048* (2013.01); *H04L 25/022* (2013.01); *H04L 25/0212* (2013.01); *H04L 2025/03624* (2013.01)

(56) References Cited

U.S. PATENT DOCUMENTS

| | | | |
|---|---|---|---|
| 7,133,474 B2* | 11/2006 | Ramasubramanian et al. | 375/343 |
| 7,145,940 B2 | 12/2006 | Gore et al. | |
| 7,177,297 B2 | 2/2007 | Agrawal et al. | |
| 7,280,467 B2 | 10/2007 | Smee et al. | |
| 7,418,046 B2 | 8/2008 | Gore et al. | |
| 7,457,231 B2 | 11/2008 | Vijayan et al. | |
| 8,135,088 B2 | 3/2012 | Palanki et al. | |
| 2002/0118765 A1 | 8/2002 | Nangia et al. | |
| 2002/0122381 A1 | 9/2002 | Wu et al. | |
| 2002/0126741 A1 | 9/2002 | Baum et al. | |
| 2002/0181390 A1 | 12/2002 | Mody et al. | |
| 2002/0181509 A1 | 12/2002 | Mody et al. | |
| 2003/0043776 A1 | 3/2003 | Lomp et al. | |
| 2003/0210752 A1* | 11/2003 | Krupka | 375/340 |
| 2004/0013084 A1* | 1/2004 | Thomas et al. | 370/210 |
| 2004/0047284 A1 | 3/2004 | Eidson | |
| 2004/0156386 A1* | 8/2004 | Atarashi et al. | 370/441 |
| 2004/0165650 A1 | 8/2004 | Miyazaki et al. | |
| 2004/0218698 A1* | 11/2004 | Jonsson et al. | 375/343 |
| 2005/0036481 A1 | 2/2005 | Chayat et al. | |
| 2005/0099937 A1* | 5/2005 | Oh et al. | 370/207 |
| 2005/0169411 A1 | 8/2005 | Kroeger | |
| 2005/0281290 A1 | 12/2005 | Khandekar et al. | |
| 2006/0002451 A1* | 1/2006 | Fukuta et al. | 375/132 |
| 2006/0262871 A1 | 11/2006 | Cho et al. | |
| 2007/0004465 A1* | 1/2007 | Papasakellariou | H04W 52/325 455/571 |
| 2007/0064669 A1 | 3/2007 | Classon et al. | |
| 2007/0140102 A1* | 6/2007 | Oh et al. | 370/208 |
| 2010/0120426 A1 | 5/2010 | Singh et al. | |

FOREIGN PATENT DOCUMENTS

| | | |
|---|---|---|
| CL | 1502005 | 12/2005 |
| CL | 10142005 | 12/2005 |
| CL | 14772005 | 1/2006 |
| CL | 0107-2009 | 5/2009 |
| CL | 01062009 | 5/2009 |
| CN | 1347255 A | 5/2002 |
| CN | 1462533 A | 12/2003 |
| CN | 1507727 A | 6/2004 |
| CN | 1525678 | 9/2004 |
| CN | 1565099 A | 1/2005 |
| EP | 1001566 A1 | 5/2000 |
| EP | 1414177 A1 | 4/2004 |
| EP | 1445873 A2 | 8/2004 |
| JP | 6030065 | 2/1994 |
| JP | 10322311 | 12/1998 |
| JP | 2003536291 A | 12/2003 |
| JP | 2004253899 A | 9/2004 |
| JP | 2004266814 | 9/2004 |
| JP | 2004529524 A | 9/2004 |
| JP | 2004297756 | 10/2004 |
| JP | 2011062782 A | 3/2011 |
| KR | 1020010066407 | 7/2001 |
| KR | 200314726 | 2/2003 |
| RU | 2174743 | 10/2001 |
| WO | 9963691 A1 | 12/1999 |
| WO | WO-0191393 A2 | 11/2001 |
| WO | WO0225831 A2 | 3/2002 |
| WO | 0249385 A2 | 6/2002 |
| WO | 2004038951 A2 | 5/2004 |
| WO | WO2004047311 | 6/2004 |
| WO | 2004064295 A2 | 7/2004 |
| WO | 2004077730 A2 | 9/2004 |
| WO | 2004102816 A2 | 11/2004 |
| WO | 2004114615 A1 | 12/2004 |
| WO | WO-2010054338 | 5/2010 |

OTHER PUBLICATIONS

Chu, David C., "Polyphase Codes with Good Periodic Correlation Properties," IEEE Transactions on Information Theory, Jul. 1972, pp. 531-532.

De Broeck I,"Interleaved Frequency-Division Multiple-Access", Internet Citation, Jan. 9, 2004, XP002424443, Retrieved from the Internet: URL: http://elib.tu-darmstadt.de/diss/000525/ [retrieved on Mar. 1, 2007].

Dinis, R. et al.: "A Multiple Access Scheme for the Uplink of Broadband Wireless Systems," Global Telecommunications Conference, 2004. Globecom "04. IEEE Dallas, TX, USA Nov. 29-Dec. 3, 2004, vol. 6, pp. 3808-3812, XP010758449 Piscataway, NJ, USA, IEEE.

European Search Report—EP10011615—Search Authority—Munich—Mar. 29, 2012.

European Search Report—EP10011616—Search Authority—Berlin—Mar. 29, 2012.

Frank, T. et al., "Robustness of IFDMA as Air Interface Candidate for Future High Rate Mobile Radio Systems", Advances in Radio Science—Kleinheubacher Berichte, Jan. 1, 2005, vol. 3, pp. 265-270, Copernicus GMBH, Katlenburg-Lindau, DE, XP002441671, ISSN: 1684-9965.

Galda D., et al., "A Low Complexity Transmission Structure for OFDM-FDMA Uplink Systems", IEEE Vehicular Technology Conference, VTC2OO2-Spring, vol. 4, May 6, 2002, pp. 1737-1741, XP010622113.

International Search Report PCT/US2006/008300, International Search Authority European Patent Office Jun. 21, 2006.

Nangia, V. et al., "Experimental Broadband OFDM System: Field Results for OFDM and OFDM with Frequency Domain Spreading", VTC 2002-Fall. 2002 IEEE 56th Vehicular Technology Conference Proceedings. Vancouver, Canada, Sep. 24-28, 2002; New York, NY: IEEE, US, vol. 1, pp. 223-227, XP010608550, DOI:10.1109/VETECF.2002.1040337, ISBN: 978-0-7803-7467-6.

Rapajic, Predrag et al., "Merit Factor Based Comparison of New Polyphase Sequences", IEEE Communications Letters, vol. 2, No. 10, pp. 269-270, Oct. 1998.

Schnell, M. et al., "A Promising New Wideband Multiple-Access Scheme for Future Mobile Communications Systems", European Transactions on Telecommunications, Jul. 1, 1999, vol. 10, No. 4, pp. 417-427, Wiley & Sons, Chichester, GB, XP009069928, ISSN: 1 124-31 8X.

Written Opinion of the International Searching Authority, PCT/US2006/008300, International Search Authority European Patent Office Jun. 21, 2006.

Falconer D., et al., "Frequency Domain Equalization for Single-Carrier Broadband Wireless Systems", IEEE Communications Magazine, Apr. 1, 2002, pp. 58-66, vol. 40, No. 4, IEEE Service Center, Piscataway, US, XP011092809, ISSN: 0163-6804.

Taiwan Search Report—TW095107670—TIPO—Jan. 7, 2013.

Taiwan Search Report—TW102114743—TIPO—Dec. 2, 2014.

Falconer D. D., et al., "Broadband Wireless Using Single Carrier and Frequency Domain Equalization" Wireless Personal Multimedia Communications, 2002. The 5th International Symposium on Oct. 27-30, 2002, Piscataway, NJ, USA, IEEE, vol. 1, Oct. 27, 2002, pp. 27-36, XP010619043, ISBN: 978-0-7803-7442-3, p. 34, left-hand column; figure 7.

Goto Y., et al., "Variable Spreading and Chip Repetition Factors (VSCRF)-CDMA in Reverse Link for Broadband Packet Wireless Access" IEICE Transactions on Communications, Communications Society, Tokyo, JP, vol. E88-B, No. 2, Feb. 1, 2005, pp. 509-519, XP001225513 ISSN: 0916-8516.

(56) References Cited

OTHER PUBLICATIONS

LG Electronics: "PAPR comparison of uplink MA schemes", 3GPP TSG RAN WG1 Meeting #41, R1-050475, May 9-13, 2005, pp. 6.
Samsung: "Uplink Transmission and Multiplexing for EUTRA", 3GPP Draft; R1-050605 UL Multiplexing, Jun. 16, 2005, XP050111420.
NTT DoCoMo, Inc., "Uplink Multiple Access Scheme for Evolved UTRA", 3GPP TSG-RAN WG1#40b, R1-050248, Apr. 7, 2005, 54 pages, Internet URL: http://www.3gpp.org/ftp/tsg_ran/WG1_RL1/TSGR1_40bis/Docs/R1-050248.zip.
European Search Report—EP15170466—Search Authority—Berlin—Dec. 1, 2015.
LG Electronics, Uplink Multiple Access scheme,3GPP TSG RAN WG1 Ad Hoc on LTE,3GPP,Jun. 15, 2005, R1-050638, p. 5, R1-050638, URL, http://gb50a/search/dir_doc/ftp.3gpp.org/tsg_ran/WG1_RL1/TSGR1_AH/LTE_AH_June-05/Docs/R1-050638.doc.

* cited by examiner

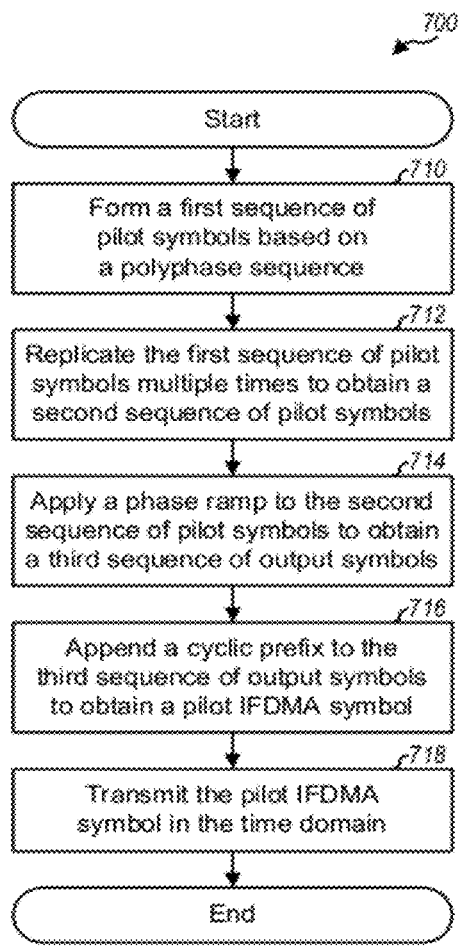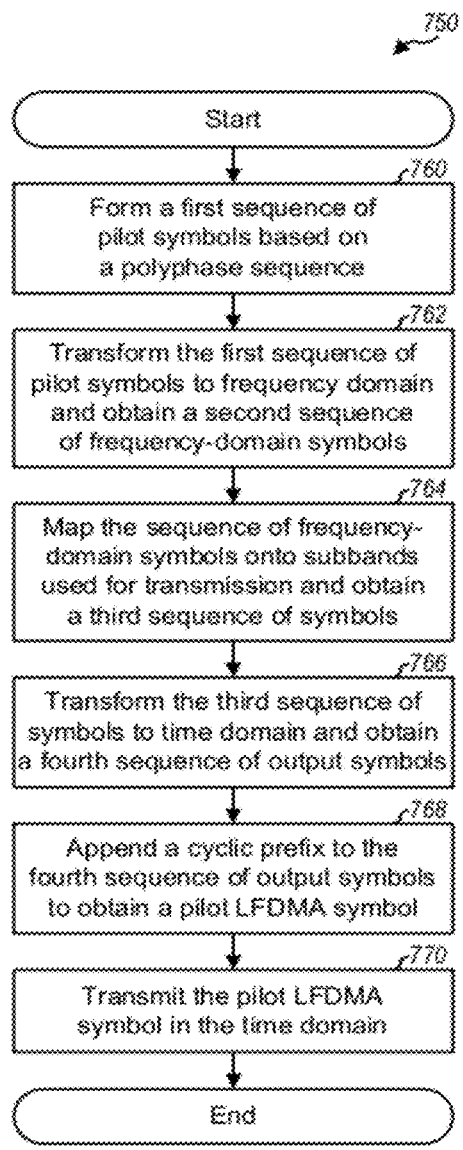
FIG. 7A
FIG. 7B

PILOT TRANSMISSION AND CHANNEL ESTIMATION FOR A COMMUNICATION SYSTEM UTILIZING FREQUENCY DIVISION MULTIPLEXING

CLAIM OF PRIORITY UNDER 35 U.S.C. §119

This present Application for Patent is a divisional of U.S. patent application Ser. No. 11/175,607, entitled "PILOT TRANSMISSION AND CHANNEL ESTIMATION FOR A COMMUNICATION SYSTEM UTILIZING FREQUENCY DIVISION MULTIPLEXING" filed Jul. 5, 2005, pending, which is assigned to the assignee of the present application and claims benefit under 35 U.S.C. §119(e) from U.S. Provisional Patent Application Ser. No. 60/659,526 entitled "ESTIMATION FOR PILOT DESIGN AND CHANNEL INTERLEAVED FREQUENCY DIVISION MULTIPLE ACCESS COMMUNICATION," filed Mar. 7, 2005, all of which are incorporated by reference herein in their entirety.

BACKGROUND

I. Field

The present invention relates generally to communication, and more specifically to pilot transmission and channel estimation for a communication system.

II. Background

Orthogonal frequency division multiplexing (OFDM) is a multi-carrier modulation technique that partitions the overall system bandwidth into multiple (K) orthogonal subbands. These subbands are also called tones, subcarriers, and frequency bins. With OFDM, each subband is associated with a respective subcarrier that may be modulated with data.

OFDM has certain desirable characteristics such as high spectral efficiency and robustness against multipath effects. However, a major drawback with OFDM is a high peak-to-average power ratio (PAPR), which means that the ratio of the peak power to the average power of an OFDM waveform can be high. The high PAPR for the OFDM waveform results from possible in-phase (or coherent) addition of all the subcarriers when they are independently modulated with data. In fact, it can be shown that the peak power can be up to K times greater than the average power for OFDM.

The high PAPR for the OFDM waveform is undesirable and may degrade performance. For example, large peaks in the OFDM waveform may cause a power amplifier to operate in a highly non-linear region or possibly clip, which would then cause intermodulation distortion and other artifacts that can degrade signal quality. The degraded signal quality can adversely affect performance for channel estimation, data detection, and so on.

There is therefore a need in the art for techniques that can mitigate the deleterious effects of high PAPR in multi-carrier modulation.

SUMMARY

Pilot transmission techniques that can avoid high PAPR and channel estimation techniques are described herein. A pilot may be generated based on a polyphase sequence and using single-carrier frequency division multiple access (SC-FDMA). A polyphase sequence is a sequence that has good temporal characteristics (e.g., a constant time-domain envelope) and good spectral characteristics (e.g., a flat frequency spectrum). SC-FDMA includes (1) interleaved FDMA (IFDMA) which transmits data and/or pilot on subbands that are uniformly spaced apart across the K total subbands and (2) localized FDMA (LFDMA) which transmits data and/or pilot typically on adjacent subbands among the K total subbands. IFDMA is also called distributed FDMA, and LFDMA is also called narrowband FDMA.

In an embodiment for pilot transmission using IFDMA, a first sequence of pilot symbols is formed based on a polyphase sequence and is replicated multiple times to obtain a second sequence of pilot symbols. A phase ramp may be applied to the second sequence of pilot symbols to obtain a third sequence of output symbols. A cyclic prefix is appended to the third sequence of output symbols to form an IFDMA symbol, which is transmitted in the time domain via a communication channel. The pilot symbols may be multiplexed with data symbols using time division multiplexing (TDM), code division multiplexing (CDM), and/or some other multiplexing scheme.

In an embodiment for pilot transmission using LFDMA, a first sequence of pilot symbols is formed based on a polyphase sequence and is transformed to the frequency domain to obtain a second sequence of frequency-domain symbols. A third sequence of symbols is formed with the second sequence of frequency-domain symbols mapped onto a group of subbands used for pilot transmission and zero symbols mapped onto the remaining subbands. The third sequence of symbols is transformed to the time domain to obtain a fourth sequence of output symbols. A cyclic prefix is appended to the fourth sequence of output symbols to form an LFDMA symbol, which is transmitted in the time domain via a communication channel.

In an embodiment for channel estimation, at least one SC-FDMA symbol is received via the communication channel and processed (e.g., demultiplexed for a TDM pilot or dechannelized for a CDM pilot) to obtain received pilot symbols. An SC-FDMA symbol may be an IFDMA symbol or an LFDMA symbol. A channel estimate is derived based on the received pilot symbols and using a minimum mean-square error (MMSE) technique, a least-squares (LS) technique, or some other channel estimation technique. Filtering, thresholding, truncation, and/or tap selection may be performed to obtain an improved channel estimate. The channel estimate may also be improved by performing iterative channel estimation or data-aided channel estimation.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 7A shows a process for generating a pilot IFDMA symbol.

FIG. 7B shows a process for generating a pilot LFDMA symbol.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The pilot transmission and channel estimation techniques described herein may be used for various communication systems that utilize multi-carrier modulation or perform frequency division multiplexing. For example, these techniques may be used for a frequency division multiple access (FDMA) system, an orthogonal frequency division multiple access (OFDMA) system, an SC-FDMA system, an IFDMA system, an LFDMA system, an OFDM-based system, and so on. These techniques may also be used for the forward link (or downlink) and the reverse link (or uplink).

Figure 1:
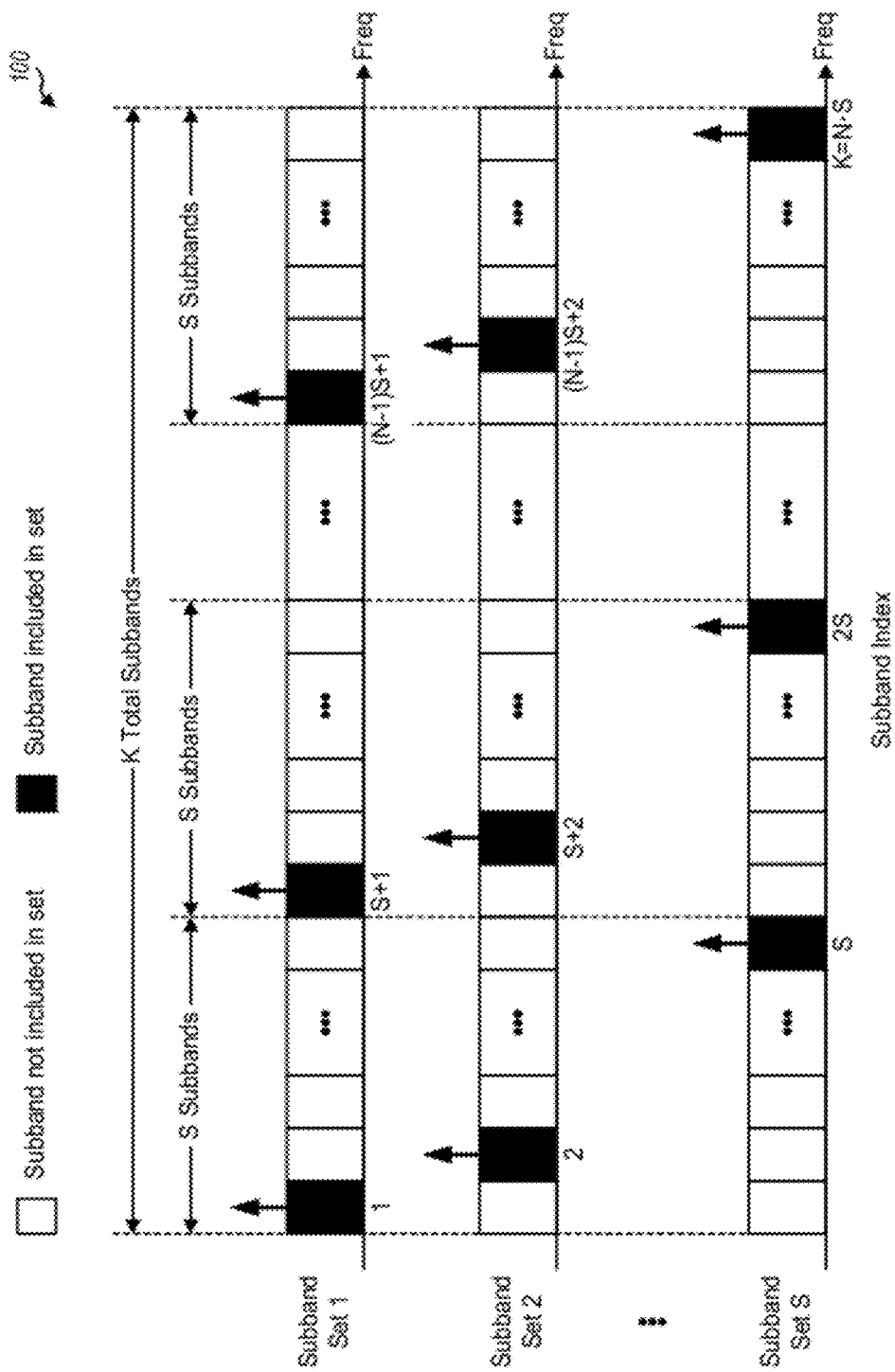
FIG. 1 shows an interlace subband structure for a communication system.

FIG. 1 shows an exemplary subband structure 100 that may be used for a communication system. The system has an overall bandwidth of BW MHz, which is partitioned into K orthogonal subbands that are given indices of 1 through K. The spacing between adjacent subbands is BW/K MHz. In a spectrally shaped system, some subbands on both ends of the system bandwidth are not used for data/pilot transmission and serve as guard subbands to allow the system to meet spectral mask requirements. Alternatively, the K subbands may be defined over the usable portion of the system bandwidth. For simplicity, the following description assumes that all K total subbands may be used for data/pilot transmission.

For subband structure 100, the K total subbands are arranged into S disjoint subband sets, which are also called interlaces. The S sets are disjoint or non-overlapping in that each of the K subbands belongs in only one set. Each set contains N subbands that are uniformly distributed across the K total subbands such that consecutive subbands in the set are spaced apart by S subbands, where K=S·N. Thus, set u contains subbands u, S+u, 2S+u, . . . , (N−1)·S+u, where u is the set index and u∈{1, . . . , S}. Index u is also a subband offset that indicates the first subband in the set. The N subbands in each set are interlaced with the N subbands in each of the other S−1 sets.

FIG. 1 shows a specific subband structure. In general, a subband structure may include any number of subband sets, and each set may include any number of subbands. The sets may include the same or different numbers of subbands. For example, some sets may include N subbands while other sets may include 2N, 4N or some other number of subbands. The subbands in each set are uniformly distributed (i.e., evenly spaced) across the K total subbands in order to achieve the benefits described below. For simplicity, the following description assumes the use of subband structure 100 in FIG. 1.

The S subband sets may be viewed as S channels that may be used for data and pilot transmission. For example, each user may be assigned one subband set, and data and pilot for each user may be sent on the assigned subband set. S users may simultaneously transmit data/pilot on the S subband sets via the reverse link to a base station. The base station may also simultaneously transmit data/pilot on the S subband sets via the forward link to S users. For each link, up to N modulation symbols may be sent in each symbol period (in time or frequency) on the N subbands in each set without causing interference to the other subband sets. A modulation symbol is a complex value for a point in a signal constellation (e.g., for M-PSK, M-QAM, and so on).

For OFDM, modulation symbols are transmitted in the frequency domain. For each subband set, N modulation symbols may be transmitted on the N subbands in each symbol period. In the following description, a symbol period is the time duration of one OFDM symbol, one IFDMA symbol, or one LFDMA symbol. One modulation symbol is mapped to each of the N subbands used for transmission, and a zero symbol (which is a signal value of zero) is mapped to each of the K−N unused subbands. The K modulation and zero symbols are transformed from the frequency domain to the time domain by performing a K-point inverse fast Fourier transform (IFFT) on the K modulation and zero symbols to obtain K time-domain samples. The time-domain samples can have high PAPR.

Figure 2:
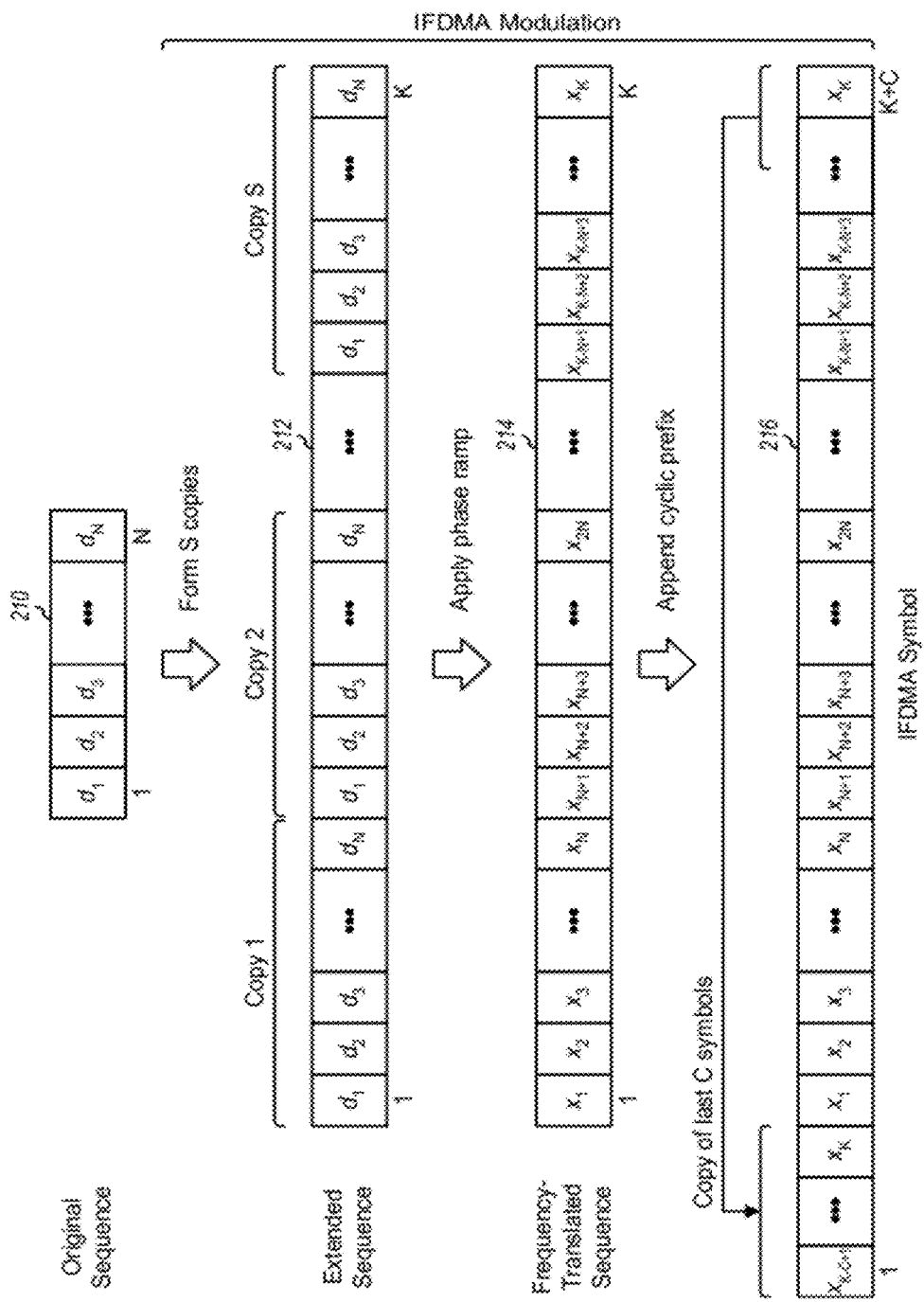
FIG. 2 shows generation of an IFDMA symbol for one set of N subbands.

FIG. 2 shows the generation of an IFDMA symbol for one set of N subbands. An original sequence of N modulation symbols to be transmitted in one symbol period on the N subbands in set u is denoted as $\{d_1, d_2, d_3, \ldots, d_N\}$ (block 210). The original sequence of N modulation symbols is replicated S times to obtain an extended sequence of K modulation symbols (block 212). The N modulation symbols are sent in the time domain and collectively occupy N subbands in the frequency domain. The S copies of the original sequence result in the N occupied subbands being spaced apart by S subbands, with S−1 subbands of zero power separating adjacent occupied subbands. The extended sequence has a comb-like frequency spectrum that occupies subband set 1 in FIG. 1.

The extended sequence is multiplied with a phase ramp to obtain a frequency-translated sequence of output symbols (block 214). Each output symbol in the frequency-translated sequence may be generated as follows:

$$x_n = d_n \cdot e^{-j2\pi \cdot (n-1) \cdot (u-1)/K}, \text{ for } n=1, \ldots, K, \quad \text{Eq (1)}$$

where $d_n$ is the n-th modulation symbol in the extended sequence and $x_n$ the n-th output symbol in the frequency-translated sequence. The phase ramp $e^{-j2\pi \cdot (n-1) \cdot (u-1)/K}$ has a phase slope of $2\pi \cdot (u-1)/K$, which is determined by the first subband in set u. The terms "n−1" and "u−1" in the exponent of the phase ramp are due to indices n and u starting with '1' instead of '0'. The multiplication with the phase ramp in the time domain translates the comb-like frequency spectrum of the extended sequence up in frequency so that the frequency-translated sequence occupies subband set u in the frequency domain.

The last C output symbols of the frequency-translated sequence are copied to the start of the frequency-translated sequence to form an IFDMA symbol that contains K+C output symbols (block 216). The C copied output symbols are often called a cyclic prefix or a guard interval, and C is the cyclic prefix length. The cyclic prefix is used to combat intersymbol interference (ISI) caused by frequency selective fading, which is a frequency response that varies across the system bandwidth. The K+C output symbols in the IFDMA symbol are transmitted in K+C sample periods, one output symbol in each sample period. A symbol period for IFDMA is the duration of one IFDMA symbol and is equal to K+C sample periods. A sample period is also often called a chip period.

Since the IFDMA symbol is periodic in the time domain (except for the phase ramp), the IFDMA symbol occupies a set of N equally spaced subbands starting with subband u. Users with different subband offsets occupy different subband sets and are orthogonal to one another, similar to OFDMA.

Figure 3:
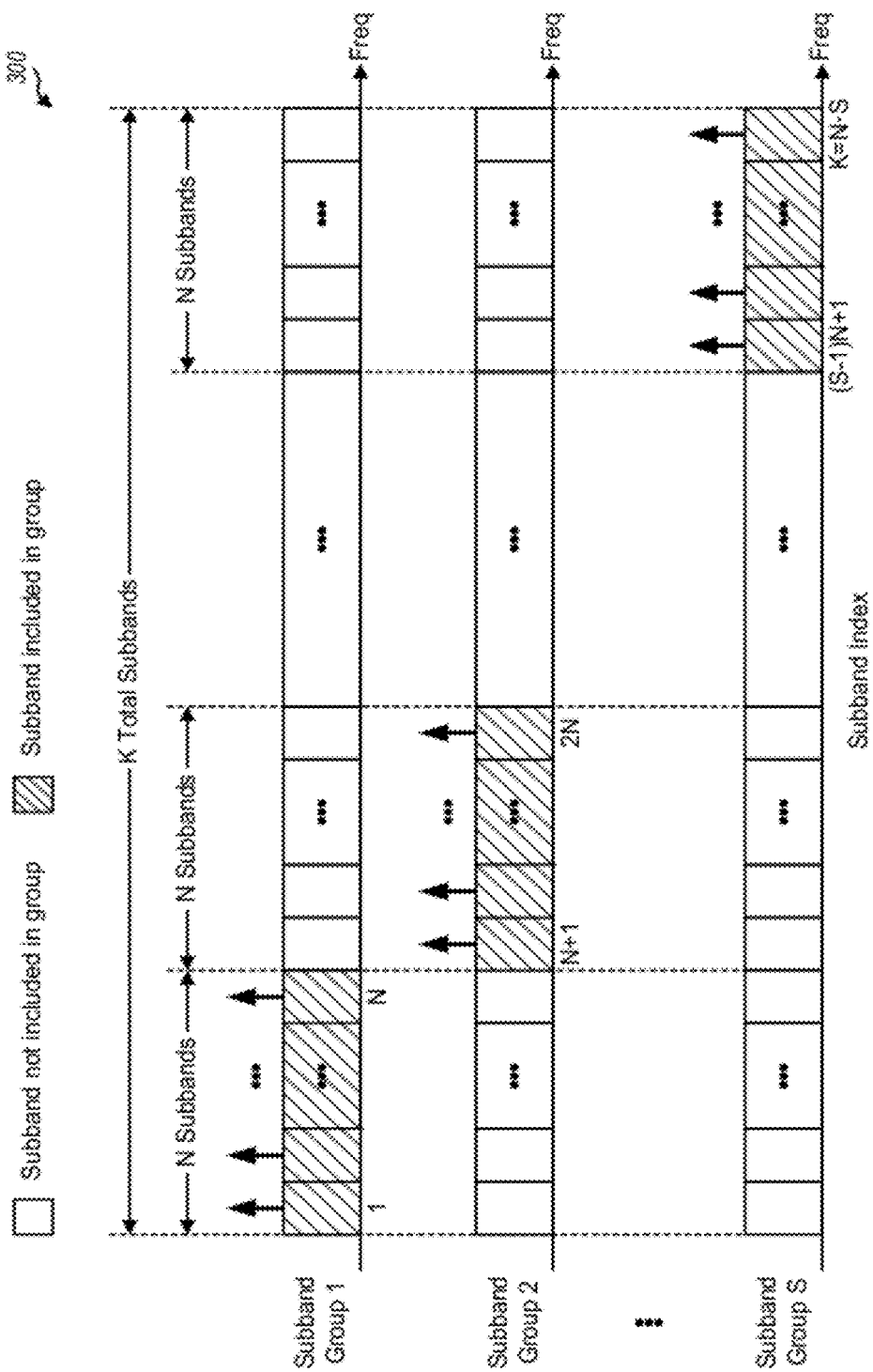
FIG. 3 shows a narrowband subband structure.

FIG. 3 shows an exemplary narrowband subband structure 300 that may be used for a communication system. For subband structure 300, the K total subbands are arranged into S non-overlapping groups. Each group contains N subbands that are adjacent to one another. In general, N>1, S>1, and K=S·N, where N and S for narrowband subband structure 300 may be the same or different from N and S for interlace subband structure 100 in FIG. 1. Group v contains subbands $(v-1)\cdot N+1, (v-1)\cdot N+2, \ldots, v\cdot N$, where v is the group index and $v \in \{1, \ldots, S\}$. In general, a subband structure may include any number of groups, each group may contain any number of subbands, and the groups may contain the same or different numbers of subbands.

Figure 4:
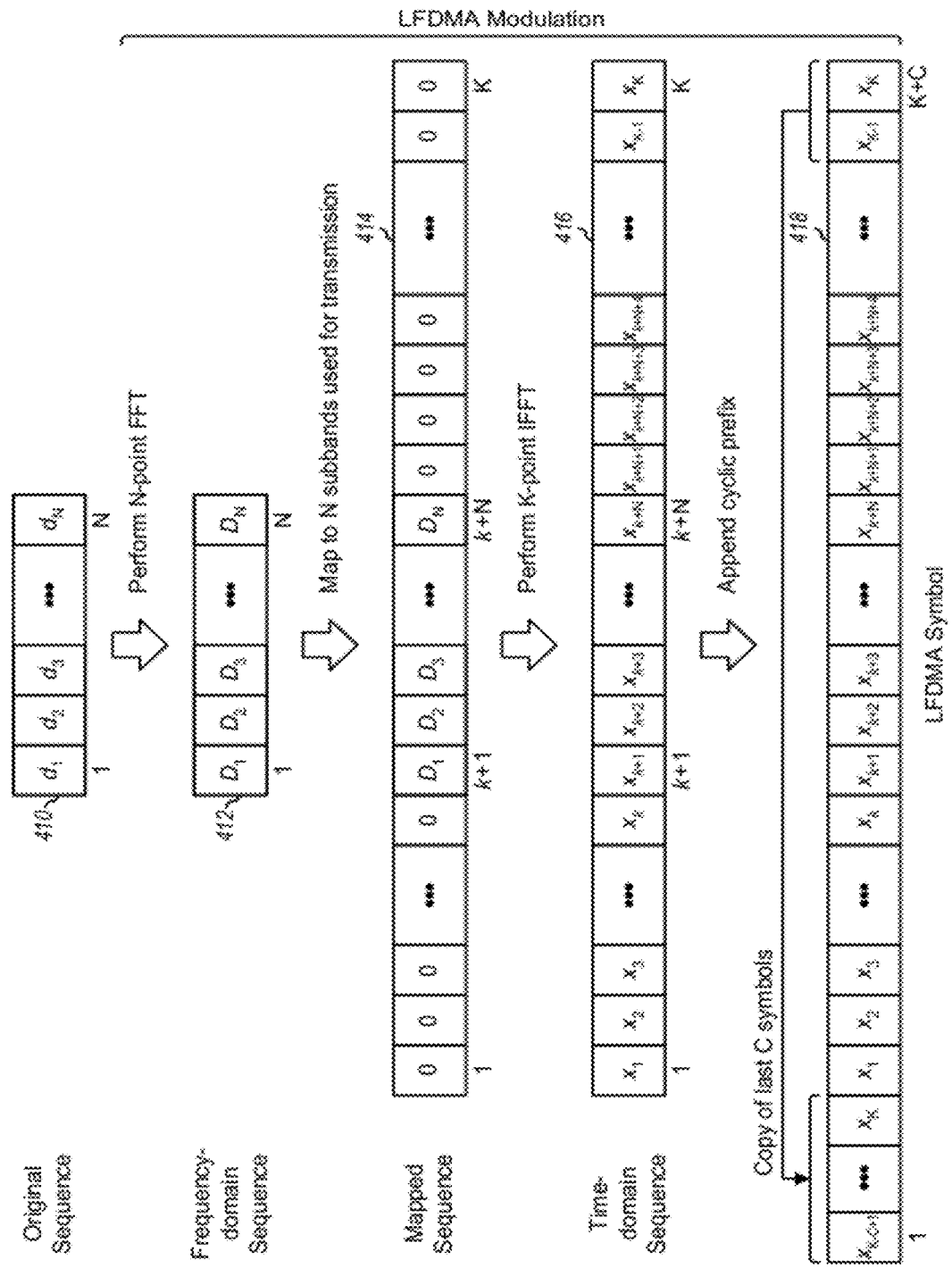
FIG. 4 shows generation of an LFDMA symbol for one group of N subbands.

FIG. 4 shows the generation of an LFDMA symbol for one group of N subbands. An original sequence of N modulation symbols to be transmitted in one symbol period on the subband group is denoted as $\{d_1, d_2, d_3, \ldots, d_N\}$ (block 410). The original sequence of N modulation symbols is transformed to the frequency domain with an N-point fast Fourier transform (FFT) to obtain a sequence of N frequency-domain symbols (block 412). The N frequency-domain symbols are mapped onto the N subbands used for transmission and K−N zero symbols are mapped onto the remaining K−N subbands to generate a sequence of K symbols (block 414). The N subbands used for transmission have indices of k+1 through k+N, where $1 \leq k \leq (K-N)$. The sequence of K symbols is then transformed to the time domain with a K-point IFFT to obtain a sequence of K time-domain output symbols (block 416). The last C output symbols of the sequence are copied to the start of the sequence to form an LFDMA symbol that contains K+C output symbols (block 418).

The LFDMA symbol is generated such that it occupies a group of N adjacent subbands starting with subband k+1. Users may be assigned with different non-overlapping subband groups and are then orthogonal to one another, similar to OFDMA. Each user may be assigned different subband groups in different symbol periods to achieve frequency diversity. The subband groups for each user may be selected, e.g., based on a frequency hopping pattern.

SC-FDMA has certain desirable characteristics such as high spectral efficiency and robustness against multipath effects, similar to OFDMA. Furthermore, SC-FDMA does not have a high PAPR since the modulation symbols are sent in the time domain. The PAPR of an SC-FDMA waveform is determined by the signal points in the signal constellation selected for use (e.g., M-PSK, M-QAM, and so on). However, the time-domain modulation symbols in SC-FDMA are prone to intersymbol interference due to a non-flat communication channel. Equalization may be performed on the received modulation symbols to mitigate the deleterious effects of intersymbol interference. The equalization requires a fairly accurate channel estimate for the communication channel, which may be obtained using the techniques described herein.

A transmitter may transmit a pilot to facilitate channel estimation by a receiver. A pilot is a transmission of symbols that are known a priori by both the transmitter and receiver. As used herein, a data symbol is a modulation symbol for data, and a pilot symbol is a modulation symbol for pilot. The data symbols and pilot symbols may be derived from the same or different signal constellations. The pilot may be transmitted in various manners, as described below.

Figure 5A:
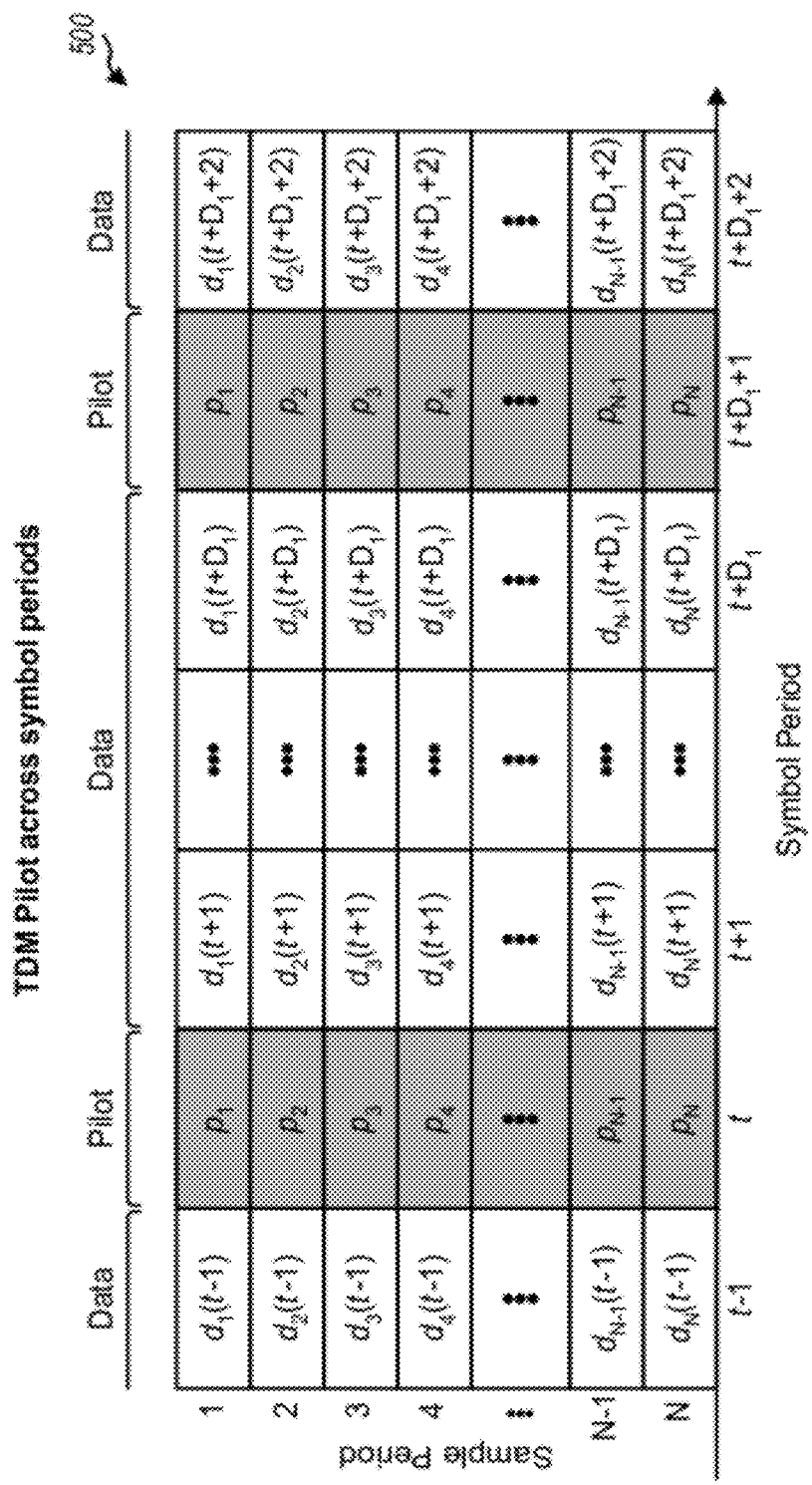
FIGS. 5A and 5B show two TDM pilot schemes with pilot and data being multiplexed across symbol periods and sample periods, respectively.

FIG. 5A shows a TDM pilot scheme 500 with pilot and data being multiplexed across symbol periods. For example, data may be sent in $D_1$ symbol periods, then pilot may be sent in the next $P_1$ symbol periods, then data may be sent in the next $D_1$ symbol periods, and so on. In general $D_1 \geq 1$ and $P_1 \geq 1$. For the example shown in FIG. 5A, $D_1 > 1$ and $P_1 = 1$. A sequence of N data symbols may be sent on one subband set/group in each symbol period used for data transmission. A sequence of N pilot symbols may be sent on one subband set/group in each symbol period used for pilot transmission. For each symbol period, a sequence of N data or pilot symbols may be converted to an IFDMA symbol or an LFDMA symbol as described above for FIGS. 2 and 4, respectively. An SC-FDMA symbol may be an IFDMA symbol or an LFDMA symbol. An SC-FDMA symbol containing only pilot is called a pilot SC-FDMA symbol, which may be a pilot IFDMA symbol or a pilot LFDMA symbol. An SC-FDMA symbol containing only data is called a data SC-FDMA symbol, which may be a data IFDMA symbol or a data LFDMA symbol.

Figure 5B:
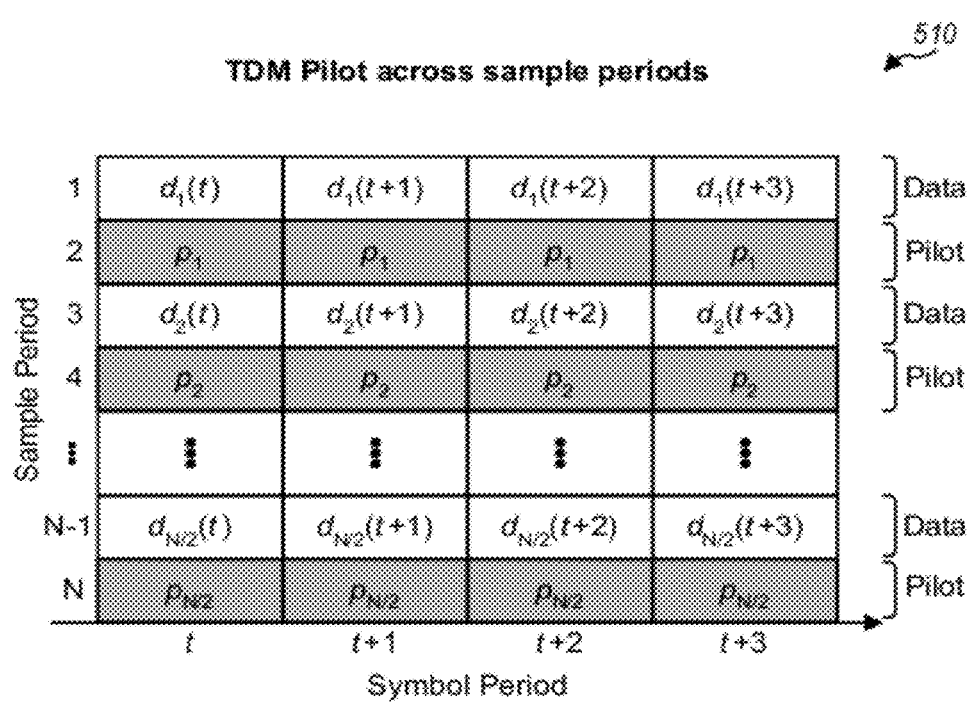

FIG. 5B shows a TDM pilot scheme 510 with pilot and data being multiplexed across sample periods. For this embodiment, data and pilot are multiplexed within the same SC-FDMA symbol. For example, data symbols may be sent in $D_2$ sample periods, then pilot symbols may be sent in the next $P_2$ sample periods, then data symbols are sent in the next $D_2$ sample periods, and so on. In general $D_2 \geq 1$ and $P_2 \geq 1$. For the example shown in FIG. 5B, $D_2 = 1$ and $P_2 = 1$. A sequence of N data and pilot symbols may be sent on one subband set/group in each symbol period and may be converted to an SC-FDMA symbol as described above for FIGS. 2 and 4.

A TDM pilot scheme may also multiplex pilot and data across both symbol periods and sample periods. For example, data and pilot symbols may be sent in some symbol periods, only data symbols may be sent in some other symbol periods, and only pilot symbols may be sent in certain symbol periods.

Figure 5C:
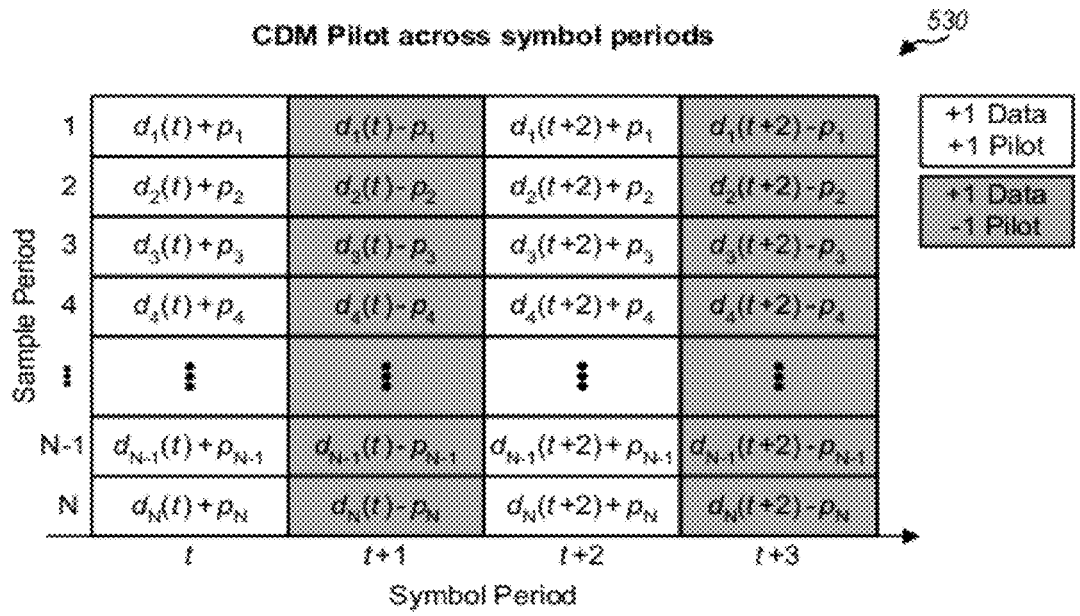
FIGS. 5C and 5D show two CDM pilot schemes with pilot and data being combined across symbol periods and sample periods, respectively.

FIG. 5C shows a CDM pilot scheme 530 with pilot and data being combined across symbol periods. For this embodiment, a sequence of N data symbols is multiplied with a first M-chip orthogonal sequence $\{w_d\}$ to obtain M sequences of scaled data symbols, where M>1. Each sequence of scaled data symbols is obtained by multiplying the original sequence of data symbols with one chip of the orthogonal sequence $\{w_d\}$. Similarly, a sequence of N pilot symbols is multiplied with a second M-chip orthogonal sequence $\{w_p\}$ to obtain M sequences of scaled pilot symbols. Each sequence of scaled data symbols is then added with a corresponding sequence of scaled pilot symbols to obtain a sequence of combined symbols. M sequences of combined symbols are obtained by adding the M sequences of scaled data symbols with the M sequences of scaled pilot symbols. Each sequence of combined symbols is converted to an SC-FDMA symbol.

The orthogonal sequences may be Walsh sequences, OVSF sequences, and so on. For the example shown in FIG. 5C, M=2, the first orthogonal sequence is $\{w_d\} = \{+1 \ +1\}$, and the second orthogonal sequence is $\{w_p\} = \{+1 \ -1\}$. The N data symbols are multiplied by +1 for symbol period t and also by +1 for symbol period t+1. The N pilot symbols are multiplied by +1 for symbol period t and by −1 for symbol period t+1.

For each symbol period, the N scaled data symbols are added with the N scaled pilot symbols to obtain N combined symbols for that symbol period.

Figure 5D:
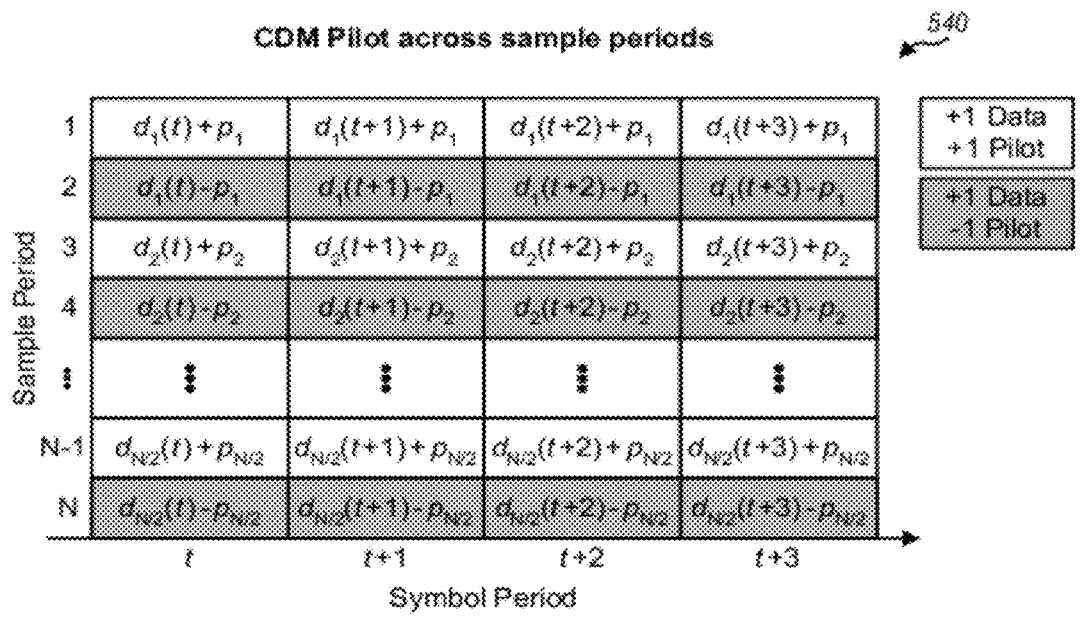

FIG. 5D shows a CDM pilot scheme 540 with pilot and data being combined across sample periods. For this embodiment, a sequence of N/M data symbols is multiplied with the M-chip orthogonal sequence $\{w_d\}$ to obtain a sequence of N scaled data symbols. In particular, the first data symbol $d_1(t)$ in the original sequence is multiplied with the orthogonal sequence $\{w_d\}$ to obtain the first M scaled data symbols, the next data symbol $d_2(t)$ is multiplied with the orthogonal sequence $\{w_d\}$ to obtain the next M scaled data symbols, and so on, and the last data symbol $d_{N/M}(t)$ in the original sequence is multiplied with the orthogonal sequence $\{w_d\}$ to obtain the last M scaled data symbols. Similarly, a sequence of N/M pilot symbols is multiplied with the M-chip orthogonal sequence $\{w_p\}$ to obtain a sequence of N scaled pilot symbols. The sequence of N scaled data symbols is added with the sequence of N scaled pilot symbols to obtain a sequence of N combined symbols, which is converted to an SC-FDMA symbol.

For the example shown in FIG. 5D, M=2, the orthogonal sequence for data is $\{w_d\}=\{+1\ +1\}$, and the orthogonal sequence for pilot is $\{w_p\}=\{+1\ -1\}$. A sequence of N/2 data symbols is multiplied with the orthogonal sequence $\{+1+1\}$ to obtain a sequence of N scaled data symbols. Similarly, a sequence of N/2 pilot symbols is multiplied with the orthogonal sequence $\{+1\ -1\}$ to obtain a sequence of N scaled pilot symbols. For each symbol period, the N scaled data symbols are added with the N scaled pilot symbols to obtain N combined symbols for that symbol period.

A CDM pilot may be sent in each symbol period, as shown in FIGS. 5C and 5D. A CDM pilot may also be sent only in certain symbol periods. A pilot scheme may also use a combination of TDM and CDM. For example, a CDM pilot may be sent in some symbol periods and a TDM pilot may be sent in other symbol periods. A frequency division multiplexed (FDM) pilot may also be sent on a designated set of subbands, e.g., for the downlink.

For the embodiments shown in FIGS. 5A through 5D, a TDM or CDM pilot is sent on the N subbands used for data transmission. In general, the subbands used for pilot transmission (or simply, the pilot subbands) may be the same as or different from the subbands used for data transmission (or simply, the data subbands). The pilot may also be sent on fewer or more subbands than the data. The data and pilot subbands may be static for an entire transmission. Alternatively, the data and pilot subbands may hop across frequency in different time slots to achieve frequency diversity. For example, a physical channel may be associated with a frequency hopping (FH) pattern that indicates one or more specific subband sets or groups to use for the physical channel in each time slot. A time slot may span one or multiple symbol periods.

Figure 6:
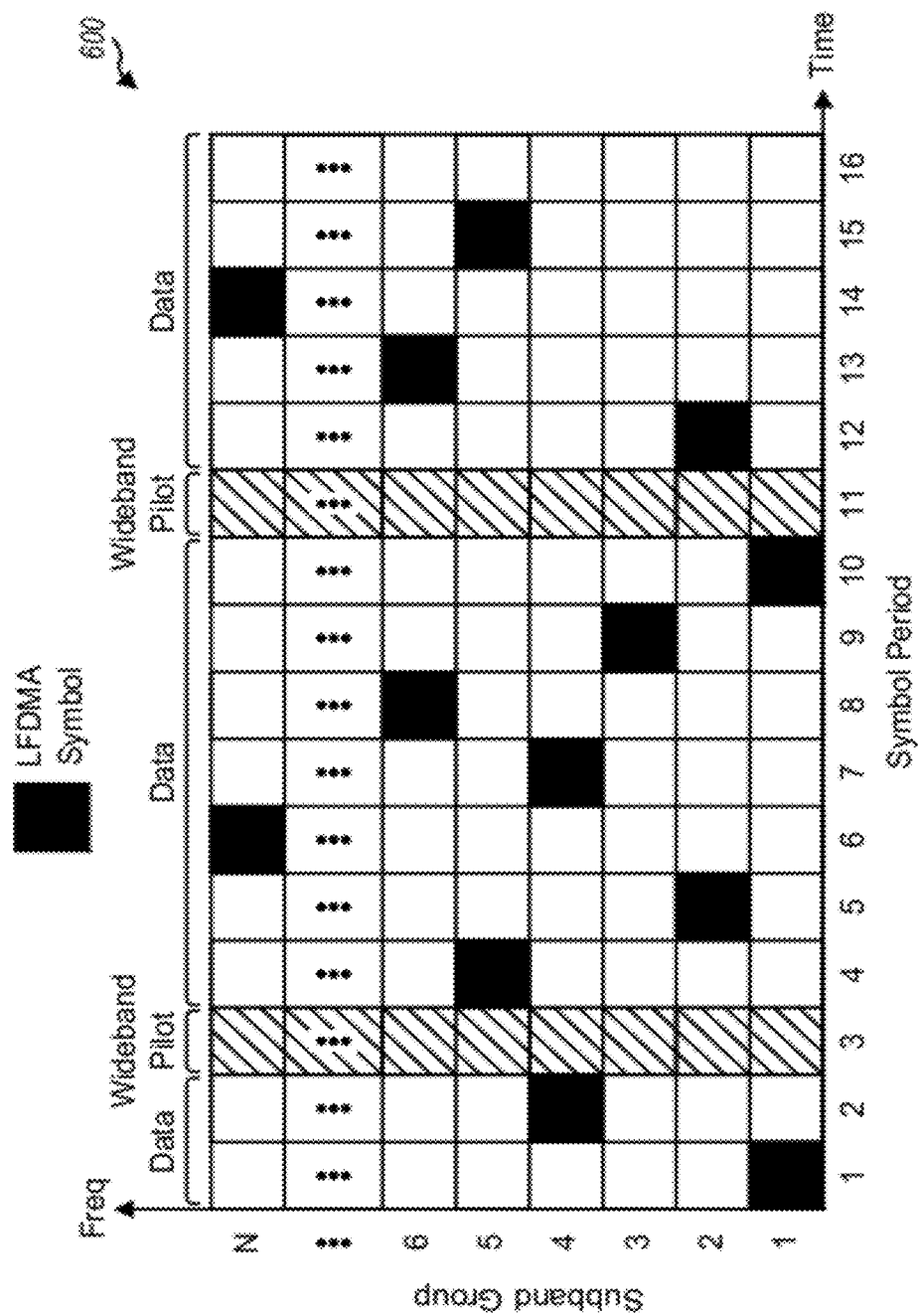
FIG. 6 shows a wideband pilot time division multiplexed with data.

FIG. 6 shows a wideband pilot scheme 600, which may be more applicable for the reverse link. For this embodiment, each user transmits a wideband pilot, which is a pilot that is sent on all or most of the K total subbands, e.g., all subbands usable for transmission. The wideband pilot may be generated in the time domain (e.g., with a pseudo-random number (PN) sequence) or in the frequency domain (e.g., using OFDM). The wideband pilot for each user may be time division multiplexed with the data transmission from that user, which may be generated using LFDMA (as shown in FIG. 6) or IFDMA (not shown in FIG. 6). The wideband pilots from all users may be transmitted in the same symbol periods, which can avoid interference from data to pilot for channel estimation. The wideband pilot from each user may be code division multiplexed (e.g., pseudo-random) with respect to the wideband pilots from other users. This may be achieved by assigning each user with a different PN sequence. The wideband pilot for each user has low peak-to-average power ratio (PAPR) and spans the entire system bandwidth, which allows a receiver to derive a wideband channel estimate for the user. For the embodiment shown in FIG. 6, the data subbands hop across frequency in different time slots. For each time slot, a channel estimate may be derived for the data subbands based on the wideband pilot.

FIGS. 5A through 6 show exemplary pilot and data transmission schemes. The pilot and data may also be transmitted in other manners using any combination of TDM, CDM, and/or some other multiplexing schemes.

The TDM and CDM pilots may be generated in various manners. In an embodiment, the pilot symbols used to generate the TDM and CDM pilots are modulation symbols from a well-known signal constellation such as QPSK. A sequence of N modulation symbols may be used for the TDM pilot scheme shown in FIG. 5A and the CDM pilot scheme shown in FIG. 5C. A sequence of N/M modulation symbols may be used for the TDM pilot scheme shown in FIG. 5B and the CDM pilot scheme shown in FIG. 5D. The sequence of N modulation symbols and the sequence of N/M modulation symbols may each be selected to have (1) a frequency spectrum that is as flat as possible and (2) a temporal envelope that varies as little as possible. The flat frequency spectrum ensures that all subbands used for pilot transmission have sufficient power to allow the receiver to properly estimate the channel gains for these subbands. The constant envelope avoids distortion by circuit blocks such as a power amplifier.

In another embodiment, the pilot symbols used to generate the TDM and CDM pilots are formed based on a polyphase sequence that has good temporal and spectral characteristics. For example, the pilot symbols may be generated as follows:

$$p_n = e^{j\phi_n}, \text{ for } n=1,\ldots,N, \quad \text{Eq (2)}$$

where the phase $\phi_n$ may be derived based on any one of the following:

$$\varphi_n = \pi \cdot (n-1) \cdot n, \quad \text{Eq (3)}$$

$$\varphi_n = \pi \cdot (n-1)^2, \quad \text{Eq (4)}$$

$$\varphi_n = \pi \cdot [(n-1) \cdot (n-N-1)], \quad \text{Eq (5)}$$

$$\varphi_n = \begin{cases} \pi \cdot (n-1)^2 \cdot Q/N & \text{for } N \text{ even,} \\ \pi \cdot (n-1) \cdot n \cdot Q/N & \text{for } N \text{ odd.} \end{cases} \quad \text{Eq (6)}$$

In equation (6), Q and N are relatively prime. Equation (3) is for a Golomb sequence, equation (4) is for a P3 sequence, equation (5) is for a P4 sequence, and equation (6) is for a Chu sequence. The P3, P4 and Chu sequences can have any arbitrary length.

The pilot symbols may also be generated as follows:

$$P_{(l-1)\cdot T+m} = P_{l,m} = e^{j\phi_{l,m}}, \text{ for } l=1,\ldots,T \text{ and } m=1,\ldots,T, \quad \text{Eq (7)}$$

where the phase $\phi_{l,m}$ may be derived based on any one of the following:

$$\varphi_{l,m} = 2\pi \cdot (l-1) \cdot (m-1)/T, \quad \text{Eq (8)}$$

$$\varphi_{l,m} = -(\pi/T) \cdot (T - 2l + 1) \cdot [(l-1) \cdot T + (m-1)], \quad \text{Eq (9)}$$

-continued $$\varphi_{\ell,m} = \begin{cases} (\pi/T) \cdot (T - 2\ell + 1) \cdot \left[\frac{(T-1)}{2 - (m-1)}\right] & \text{for } T \text{ even,} \\ (\pi/T) \cdot (T - 2\ell + 1) \cdot \left[\frac{(T-2)}{2 - (m-1)}\right] & \text{for } T \text{ odd.} \end{cases} \quad \text{Eq (10)}$$

Equation (8) is for a Frank sequence, equation (9) is for a P1 sequence, and equation (10) is for a Px sequence. The lengths for the Frank, P1 and Px sequences are constrained to be $N=T^2$, where T is a positive integer.

A sequence of pilot symbols generated based on any of the polyphase sequences described above has both a flat frequency spectrum and a constant time-domain envelope. Other polyphase sequences having good spectral characteristics (e.g., a flat or known frequency spectrum) and good temporal characteristics (e.g., a constant or known time-domain envelope) may also be used. A TDM or CDM pilot generated with this pilot symbol sequence would then have (1) a low PAPR, which avoids distortion by circuit elements such as a power amplifier, and (2) a flat frequency spectrum, which allows the receiver to accurately estimate the channel gains for all subbands used for pilot transmission.

FIG. 7A shows a process 700 for generating a pilot IFDMA symbol. A first sequence of pilot symbols is formed based on a polyphase sequence, which may be any one of the polyphase sequences described above or some other polyphase sequence (block 710). The first sequence of pilot symbols is replicated multiple times to obtain a second sequence of pilot symbols (block 712). A phase ramp is applied to the second sequence of pilot symbols to obtain a third sequence of output symbols (block 714). The phase ramp may be applied digitally on the pilot symbols or accounted for by the frequency upconversion process. A cyclic prefix is appended to the third sequence of output symbols to obtain a fourth sequence of output symbols, which is a pilot IFDMA symbol (block 716). The pilot IFDMA symbol is transmitted in the time domain via a communication channel (block 718). Although not shown in FIG. 7A for simplicity, the pilot symbols may be multiplexed with data symbols using TDM and/or CDM, e.g., as described above for FIGS. 5A through 5D.

FIG. 7B shows a process 750 for generating a pilot LFDMA symbol. A first sequence of pilot symbols is formed based on a polyphase sequence, which may be any one of the polyphase sequences described above or some other polyphase sequence (block 760). The first sequence of N pilot symbols is transformed to the frequency domain with an N-point FFT to obtain a second sequence of N frequency-domain symbols (block 762). The N frequency-domain symbols are then mapped onto N subbands used for pilot transmission and zero symbols are mapped to the remaining K−N subbands to obtain a third sequence of K symbols (block 764). The third sequence of K symbols is transformed to the time domain with a K-point IFFT to obtain a fourth sequence of K time-domain output symbols (block 766). A cyclic prefix is appended to the fourth sequence of output symbols to obtain a fifth sequence of K+C output symbols, which is a pilot LFDMA symbol (block 768). The pilot LFDMA symbol is transmitted in the time domain via a communication channel (block 770). Although not shown in FIG. 7B for simplicity, the pilot symbols may be multiplexed with data symbols using TDM and/or CDM, e.g., as described above for FIGS. 5A through 5D.

For both IFDMA and LFDMA, the number of subbands used for pilot transmission may be the same or different from the number of subbands used for data transmission. For example, a user may be assigned 16 subbands for data transmission and eight subbands for pilot transmission. The other eight subbands may be assigned to another user for data/pilot transmission. Multiple users may share the same subband set for interlace subband structure 100 in FIG. 1 or the same subband group for narrowband subband structure 300 in FIG. 3.

For interlace subband structure 100 in FIG. 1, an FDM pilot may be transmitted on one or more subband sets to allow receiver to perform various functions such as, for example, channel estimation, frequency tracking, time tracking, and so on. In a first staggered FDM pilot, pilot IFDMA symbols are transmitted on subband set p in some symbol periods and on subband set p+S/2 in other symbol periods. For example, if S=8, then pilot IFDMA symbols may be transmitted using a staggering pattern of {3, 7}, so that pilot IFDMA symbols are sent on subband set 3, then on subband set 7, then on subband set 3, and so on. In a second staggered FDM pilot, pilot IFDMA symbols are transmitted on subband set p(t)=[p(t−1)+Δp] mod S+1 in symbol period t, where Δp is the difference between subband set indices for two consecutive symbol periods, and the +1 is for an indexing scheme that starts with 1 instead of 0. For example, if S=8 and Δp=3, then pilot IFDMA symbols may be transmitted using a staggering pattern of {1, 4, 7, 2, 5, 8, 3, 6}, so that pilot IFDMA symbols are sent on subband set 1, then on subband set 4, then on subband set 7, and so on. Other staggering patterns may also be used. A staggered FDM pilot allows the receiver to obtain channel gain estimates for more subbands, which may improve channel estimation and detection performance.

Figure 8:
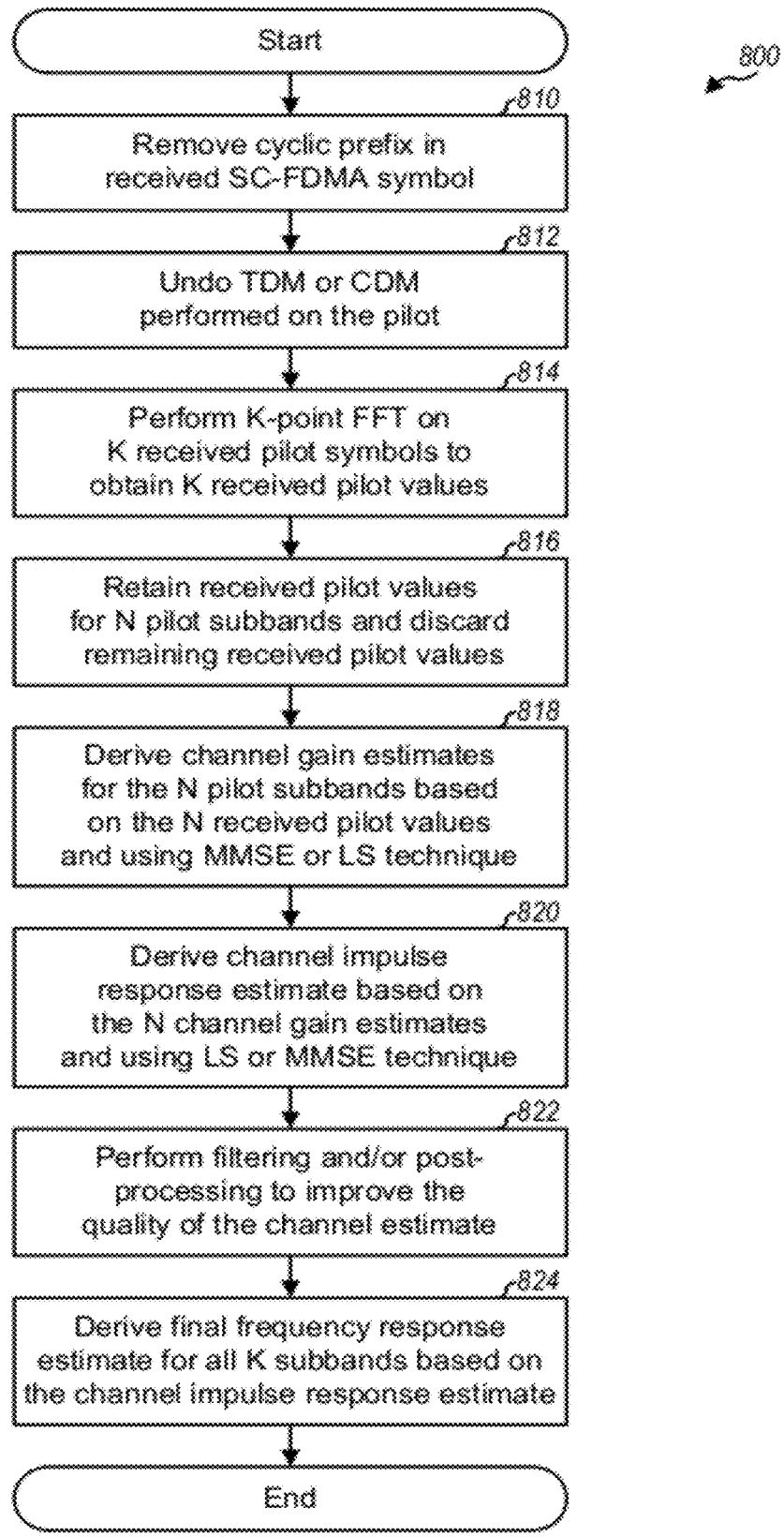
FIG. 8 shows a process for performing channel estimation.

FIG. 8 shows a process 800 performed by a receiver to estimate the response of the communication channel based on a TDM pilot or a CDM pilot sent by the transmitter. The receiver obtains an SC-FDMA symbol for each symbol period and removes the cyclic prefix in the received SC-FDMA symbol (block 810). For IFDMA, the receiver removes the phase ramp in the received SC-FDMA symbol. For both IFDMA and LFDMA, the receiver obtains K received data/pilot symbols for the SC-FDMA symbol.

The receiver then undoes the TDM or CDM performed on the pilot (block 812). For the TDM pilot scheme shown in FIG. 5A, K received pilot symbols, $r_p(n)$ for n=1, ..., K, are obtained for each pilot SC-FDMA symbol. For the TDM pilot scheme shown in FIG. 5B, multiple received pilot symbols are obtained for each SC-FDMA symbol containing the TDM pilot.

For the CDM pilot scheme shown in FIG. 5C, M received SC-FDMA symbols containing the CDM pilot are processed to recover the pilot symbols, as follows:

$$r_p(n) = \sum_{i=1}^{M} w_{p,i} \cdot r(t_i, n), \quad \text{Eq (11)}$$

for $n = 1, \ldots, K$, where
$r(t_i, n)$ is a received sample for sample period n in symbol period $t_i$;
$w_{p,i}$ is the i-th chip of the orthogonal sequence for the pilot; and
$r_p(n)$ is a received pilot symbol for sample period n.

Equation (11) assumes that the CDM pilot is transmitted in symbol periods $t_1$ through $t_M$, where M is the length of the orthogonal sequence. K received pilot symbols are obtained from equation (11) for the CDM pilot.

For the CDM pilot scheme shown in FIG. 5D, each received SC-FDMA symbol containing the CDM pilot are processed to recover the pilot symbols, as follows:

$$r_p(n) = \sum_{i=1}^{M} w_{p,i} \cdot r((n-1) \cdot M + i), \quad \text{Eq (12)}$$

for $n = 1, \ldots, K/M$, where $r((n-1) \cdot M+i)$ is a received sample for sample period $(n-1) \cdot M+i$ in the received SC-FDMA symbol with the CDM pilot. K/M received pilot symbols are obtained from equation (12) for the CDM pilot.

A frequency selective communication channel causes intersymbol interference (ISI). However, the ISI is restricted to within a single SC-FDMA symbol because of the cyclic prefix. Furthermore, because of the cyclic prefix, a linear convolution operation due to the channel impulse response effectively becomes a circular convolution, similar to OFDMA. Therefore, it is possible to perform channel estimation, equalization, and other operations in the frequency domain when pilot symbols and data symbols are not sent in the same SC-FDMA symbol.

For the TDM scheme shown in FIG. 5A and the CDM scheme shown in FIG. 5C, the receiver obtains K received pilot symbols for each pilot transmission. A K-point FFT may be performed on the K received pilot symbols, $r_p(n)$ for n= 1, . . . , K, to obtain K received pilot values in the frequency domain, $R_p(k)$ for k=1, . . . , K (block 814). The received pilot values may be given as:

$$R_p(k) = H(k) \cdot P(k) + N(k), \text{ for } k=1, \ldots, K, \quad \text{Eq (13)}$$

where

P(k) is the transmitted pilot value for subband k;
H(k) is the complex gain for the communication channel for subband k;
$R_p(k)$ is the received pilot values for subband k; and
N(k) is the noise for subband k.

The K-point FFT provides K received pilot values for the K total subbands. Only N received pilot values for the N subbands used for pilot transmission (which are called pilot subbands) are retained, and the remaining K−N received pilot values are discarded (block 816). Different pilot subbands are used for IFDMA and LFDMA and hence different received pilot values are retained for IFDMA and LFDMA. The retained pilot values are denoted as $R_p(k)$ for k=1, . . . , N. For simplicity, the noise may be assumed to be additive white Gaussian noise (AWGN) with zero mean and a variance of $N_0$.

The receiver may estimate the channel frequency response using various channel estimation techniques such as an MMSE technique, a least-squares (LS) technique, and so on. The receiver derives channel gain estimates for the N pilot subbands based on the N received pilot values and using the MMSE or LS technique (block 818). For the MMSE technique, an initial frequency response estimate for the communication channel may be derived based on the received pilot values, as follows:

$$\hat{H}_{mmse}(k) = \frac{R_p(k) \cdot P^*(k)}{|P(k)|^2 + N_0}, \quad \text{Eq (14)}$$

for $k = 1, \ldots, N$, where $\hat{H}_{mmse}(k)$ is a channel gain estimate for subband k and "*" denotes a complex conjugate. The initial frequency response estimate contains N channel gains for the N pilot subbands. The pilot symbol sequence may be generated based on a polyphase sequence having a flat frequency response. In this case, |P(k)|=1 for all values of k, and equation (14) may be expressed as:

$$\hat{H}_{mmse}(k) = \frac{R_p(k) \cdot P^*(k)}{1 + N_0}, \quad \text{Eq (15)}$$

for $k = 1, \ldots, N$.

The constant factor $1/(1+N_0)$ may be removed to provide an unbiased MMSE frequency response estimate, which may be expressed as:

$$\hat{H}_{mmse}(k) = R_p(k) \cdot P^*(k), \text{ for } k=1, \ldots, N. \quad \text{Eq (16)}$$

For the LS technique, an initial frequency response estimate may be derived based on the received pilot values, as follows:

$$\hat{H}_{ls}(k) = \frac{R_p(k)}{P(k)}, \quad \text{Eq (17)}$$

for $k = 1, \ldots, N$.

The impulse response of the communication channel may be characterized by L taps, where L may be much less than N. That is, if an impulse is applied to the communication channel by the transmitter, then L time-domain samples (at the sample rate of BW MHz) would be sufficient to characterize the response of the communication channel based on this impulse stimulus. The number of taps (L) for the channel impulse response is dependent on the delay spread of the system, which is the time difference between the earliest and latest arriving signal instances of sufficient energy at the receiver. A longer delay spread corresponds to a larger value for L, and vice versa.

A channel impulse response estimate may be derived based on the N channel gain estimates and using LS or MMSE technique (block 820). A least-squares channel impulse response estimate with L taps, $\hat{h}_{ls}(n)$ for n=1, . . . , L, may be derived based on the initial frequency response estimate, as follows:

$$\underline{\hat{h}}_{L \times 1}^{ls} = (\underline{W}_{N \times L}^H \underline{W}_{N \times L})^{-1} \underline{W}_{N \times L}^H \underline{\hat{H}}_{N \times 1}^{init}, \quad \text{Eq (18)}$$

where $\underline{\hat{H}}_{N \times 1}^{init}$ is an N×1 vector containing $\hat{H}_{ls}(k)$ or $\hat{H}_{mmse}(k)$ for k=1, . . . , N;
$\underline{W}_{N \times L}$ is a sub-matrix of a Fourier matrix $\underline{W}_{K \times K}$;
$\underline{\hat{h}}_{L \times 1}^{ls}$ is an L×1 vector containing $\hat{h}_{ls}(n)$ for n=1, . . . , L; and
"H" denotes a conjugate transpose.

The Fourier matrix $\underline{W}_{K \times K}$ is defined such that the (u, v)-th entry, $f_{u,v}$, is given as:

$$f_{u,v} = e^{-j2\pi \frac{(u-1)(v-1)}{K}}, \quad \text{Eq (19)}$$

for $u = 1, \ldots, K$ and $v = 1, \ldots, K$, where u is a row index and v is a column index. $\underline{W}_{N \times L}$ contains N rows of $\underline{W}_{K \times K}$ corresponding to the N pilot subbands. Each row of $\underline{W}_{N \times L}$ contains the first L elements of the corresponding row of $\underline{W}_{K \times K}$. $\underline{\hat{h}}_{L \times 1}^{ls}$ contains the L taps of the least-squares channel impulse response estimate.

An MMSE channel impulse response estimate with L taps, $\hat{h}_{mmse}(n)$ for n=1, ..., L, may be derived based on the initial frequency response estimate, as follows:

$$\underline{\hat{h}}_{L\times 1}^{mmse} = (\underline{W}_{N\times L}^H \underline{W}_{N\times L} + \underline{N}_{L\times L})^{-1} \underline{W}_{N\times L}^H \underline{\hat{H}}_{N\times 1}^{init}, \quad \text{Eq (20)}$$

where $\underline{N}_{L\times L}$ is an L×L autocovariance matrix of noise and interference. For additive white Gaussian noise (AWGN), the autocovariance matrix may be given as $\underline{N}_{L\times L} = \sigma_n^2 \cdot \underline{I}$, where $\sigma_n^2$ is the noise variance. An N-point IFFT may also be performed on the initial frequency response estimate to obtain a channel impulse response estimate with N taps.

Filtering and/or post-processing may be performed on the initial frequency response estimate and/or the channel impulse response estimate to improve the quality of the channel estimate, as described below (block 822). A final frequency response estimate for all K subbands may be obtained by (1) zero-padding the L-tap or N-tap channel impulse response estimate to length K and (2) performing a K-point FFT on the extended impulse response estimate (block 824). A final frequency response estimate for all K subbands may also be obtained by (1) interpolating the N channel gain estimates, (2) performing least-squares approximation on the N channel gain estimates, or (3) using other approximation techniques.

A receiver can derive a longer channel impulse response estimate based on a staggered FDM pilot. In general, a channel impulse response estimate with $L_T$ taps may be obtained based on pilot IFDMA symbols sent on $L_T$ different subbands in one or more symbol periods. For example, if $L_T$=2N, then an impulse response estimate with 2N taps may be obtained based on two or more pilot IFDMA symbols sent on two or more subband sets in two or more symbol periods. A full-length impulse response estimate with K taps may be obtained if the pilot is transmitted on all S subband sets using a complete staggering pattern.

The receiver may derive a longer impulse response estimate of length $L_T$ by filtering initial impulse response estimates of length N for a sufficient number of different subband sets. Each initial impulse response estimate may be derived based on a pilot IFDMA symbol for one subband set. If the pilot is transmitted on a different subband set in each symbol period, then the filtering may be performed over a sufficient number of symbol periods to obtain the longer impulse response estimate.

For SC-FDMA, filtering may be performed on initial frequency response estimates, least-squares or MMSE channel impulse response estimates, and/or final frequency response estimates obtained for different symbol periods to improve the quality of the channel estimate. The filtering may be based on a finite impulse response (FIR) filter, an infinite impulse response (IIR) filter, or some other type of filter. The filter coefficients may be selected to achieve the desired amount of filtering, which may be selected based on a trade off between various factors such as, e.g., the desired channel estimate quality, the ability to track fast changes in the channel, filter complexity, and so on.

A frequency response estimate and/or a channel impulse response estimate for the communication channel may also be obtained in other manners using other channel estimation techniques.

Various post-processing operations may be performed to improve the quality of the channel estimate. In certain operating environments, such as a multipath fading environment, the communication channel often has only a small number of taps in the time domain. The channel estimation described above may provide a channel impulse response estimate having a large number of taps due to noise. The post-processing attempts to remove taps that result from noise and retain taps that result from the actual channel.

In one post-processing scheme, which is called truncation, only the first L taps of the channel impulse response estimate are retained, and the remaining taps are replaced with zeros. In another post-processing scheme, which is called thresholding, taps with low energy are replaced with zeros. In an embodiment, the thresholding is performed as follows:

$$\hat{h}(n) = \begin{cases} 0 & \text{for } |\hat{h}(n)|^2 < h_{th}, \\ \hat{h}(n) & \text{otherwise,} \end{cases} \quad \text{Eq (21)}$$

for $n = 1, \ldots, K$ where
  $\hat{h}(n)$ is the n-th tap of the channel impulse response estimate, which may be equal to $\hat{h}_{mmse}(n)$ or $\hat{h}_{ls}(n)$; and
  $h_{th}$ is the threshold used to zero out low energy taps.
The threshold $h_{th}$ may be computed based on the energy of all K taps or just the first L taps of the channel impulse response estimate. The same threshold may be used for all taps. Alternatively, different thresholds may be used for different taps. For example, a first threshold may be used for the first L taps, and a second threshold (which may be lower than the first threshold) may be used for the remaining taps.

In yet another post-processing scheme, which is called tap selection, B best taps of the channel impulse response estimate are retained, where B≥1, and remaining taps are set to zeros. The number of taps to retain (denoted as B) may be a fixed or variable value. B may be selected based on a received signal-to-noise-and-interference ratio (SNR) for the pilot/data transmission, the spectral efficiency of a data packet for which the channel estimate is used, and/or some other parameter. For example, two best taps may be retained if the received SNR is within a first range (e.g., from 0 to 5 decibels (dB)), three best taps may be retained if the received SNR is within a second range (e.g., from 5 to 10 dB), four best taps may be retained if the received SNR is within a third range (e.g., from 10 to 15 dB), and so on.

Channel estimation may be performed in the time domain for the TDM pilot scheme shown in FIG. 5B, the CDM pilot scheme shown in FIG. 5D, and other pilot schemes in which data and pilot symbols are sent in the same SC-FDMA symbol. A rake estimator may be used to identify strong signal paths, for example, by (1) correlating the received symbols with the transmitted pilot symbol sequence at different time offsets and (2) identifying time offsets that provide high correlation results. The time domain channel estimation provides a set of taps for a channel impulse response estimate for the communication channel.

For all pilot schemes, the channel estimation provides a channel impulse response estimate and/or a frequency response estimate that may be used for equalization of the received data symbols. A sequence of K received data symbols is obtained for each data SC-FDMA symbol for the TDM pilot scheme shown in FIG. 5A and for each set of M received SC-FDMA symbols for the CDM pilot scheme shown in FIG. 5C. The sequence of K received data symbols may be equalized in the time domain or the frequency domain.

Frequency-domain equalization may be performed as follows. A K-point FFT is first performed on the K received data symbols, $r_d(n)$ for n=1, ..., K, to obtain K frequency-domain received data values, $R_d(k)$ for k=1, ..., K. Only N received data values for the N subbands used for data transmission are retained, and the remaining K−N received data values are discarded. The retained data values are denoted as $R_d(k)$ for k=1, ..., N.

Equalization may be performed in the frequency domain on the N received data values using the MMSE technique, as follows:

$$Z_d(k) = \frac{R_d(k) \cdot \hat{H}^*(k)}{|\hat{H}(k)|^2 + N_0}, \quad \text{for } k = 1, \ldots, N, \qquad \text{Eq (22)}$$

where $R_d(k)$ is the received data value for subband k;

$\hat{H}(k)$ is the channel gain estimate for subband k, which may be equal to $\hat{H}_{mmse}(k)$ or $\hat{H}_{ls}(k)$; and $Z_d(k)$ is the equalized data value for subband k.

Equalization may also be performed in the frequency domain on the N received data values using the zero-forcing technique, as follows:

$$Z_d(k) = \frac{R_d(k)}{\hat{H}(k)}, \quad \text{for } k = 1, \ldots, N. \qquad \text{Eq (23)}$$

For both MMSE and zero-forcing equalization, the N equalized data values, $Z_d(k)$ for k=1, ..., N, may be transformed back to the time domain to obtain a sequence of N data symbol estimates, $\hat{d}(n)$ for n=1, ..., N, which are estimates of the N data symbols in the original sequence.

Equalization may also be performed in the time domain on the sequence of K received data symbols, as follows:

$$z_d(n) = r_d(n) \otimes (n), \qquad \text{Eq (24)}$$

where $r_d(n)$ denotes the sequence of K received data symbols;

$g(n)$ denotes an impulse response of a time-domain equalizer;

$z_d(n)$ denotes a sequence of K equalized data symbols; and $\otimes$ denotes a circular convolution operation.

The frequency response of the equalizer may be derived based on the MMSE technique as: $G(k) = \hat{H}^*(k)/(|\hat{H}(k)|^2 + N_0)$, for k=1, ..., N. The frequency response of the equalizer may also be derived based on the zero-forcing technique as: $G(k) = 1/\hat{H}(k)$, for k=1, ..., N. The equalizer frequency response may be transformed to the time domain to obtain the equalizer impulse response, g(n) for n=1, ..., N, which is used for the time-domain equalization in equation (24).

The sequence of K equalized data symbols from equation (24) contains S copies of the transmitted data symbols. The S copies may be accumulated on a data symbol-by-data symbol basis to obtain N data symbol estimates, as follows:

$$\hat{d}(n) = \sum_{i=0}^{S-1} z_d(i \cdot N + n), \quad \text{for } n = 1, \ldots, N. \qquad \text{Eq (25)}$$

Alternatively, the accumulation is not performed, and N equalized data symbols for only one copy of the transmitted data are provided as the N data symbol estimates.

The receiver may also estimate interference based on the received pilot values and the channel estimate. For example, the interference for each subband may be estimated as follows:

$$I(k) = |\hat{H}(k) \cdot P(k) - R_p(k)|^2, \text{ for } k=1, \ldots, N, \qquad \text{Eq (26)}$$

where I(k) is the interference estimate for subband k. The interference estimate I(k) may be averaged over all N subbands for each SC-FDMA symbol to obtain a short-term interference estimate, which may be used for data demodulation and/or other purposes. The short-term interference estimate may be averaged over multiple SC-FDMA symbols to obtain a long-term interference estimate, which may be used to estimate operating conditions and/or for other purposes.

Other techniques may also be used to improve the quality of the channel estimate derived from a TDM pilot or a CDM pilot. These techniques include an iterative channel estimation technique and a data-aided channel estimation technique.

For the iterative channel estimation technique, an initial estimate of the communication channel is first derived based on the received pilot symbols, e.g., using the MMSE or least-squares technique. The initial channel estimate is used to derive data symbol estimates, as described above. In an embodiment, the interference due to the data symbols on the pilot symbols is estimated based on the data symbol estimates $\hat{d}(n)$ and the initial channel estimate $\hat{h}(n)$, e.g., as $\hat{i}(n) = \hat{d}(n) \otimes \hat{h}(n)$, where $\hat{i}(n)$ denotes the interference estimate. In another embodiment, the data symbol estimates are processed to obtain decoded data. The decoded data is then processed in the same manner performed at the transmitter to obtain remodulated data symbols, which are convolved with the initial channel estimate to obtain the interference estimate. For both embodiments, the interference estimate is subtracted from the received pilot symbols to obtain interference-canceled pilot symbols, $r_p^{ic}(n) = r_p(n) - \hat{i}(n)$, which are then used to derive an improved channel estimate. The process may be repeated for any number of iterations to obtain progressively better channel estimates. The iterative channel estimation technique is more suited for the TDM pilot scheme shown in FIG. 5B, the CDM pilot schemes shown in FIGS. 5C and 5D, and other pilot schemes in which the data symbols may cause intersymbol interference on the pilot symbols.

For the data-aided channel estimation technique, the received data symbols are used along with the received pilot symbols for channel estimation. A first channel estimate is derived based on the received pilot symbols and used to obtain data symbol estimates. A second channel estimate is then derived based on the received data symbols and the data symbol estimates. In an embodiment, the received data symbols $r_d(n)$ are converted to frequency-domain received data values $R_d(k)$, and the data symbol estimates $\hat{d}(n)$ are converted to frequency-domain data values $\hat{D}(k)$. The second channel estimate may be obtained by substituting $R_d(k)$ for $R_p(k)$ and $\hat{D}(k)$ for $P(k)$ in equations (14) through (18). In another embodiment, the data symbol estimates are processed to obtain decoded data, and the decoded data is processed to obtain remodulated data symbols $D_{rm}(k)$. The second channel estimate may be obtained by substituting $R_d(k)$ for $R_p(k)$ and $D_{rm}(k)$ for $P(k)$ in equations (14) through (18).

The two channel estimates obtained with the received pilot symbols and the received data symbols are combined to obtain an improved overall channel estimate. This combining may be performed, for example, as follows:

$$\hat{H}_{overall}(k) = \hat{H}_{pilot}(k) \cdot C_p(k) + \hat{H}_{data}(k) \cdot C_d(k), \quad \text{for } k=1, \ldots, N, \qquad \text{Eq (27)}$$

where $\hat{H}_{pilot}(k)$ is the channel estimate obtained based on the received pilot symbols;

$\hat{H}_{data}(k)$ is the channel estimate obtained based on the received data symbols;

$C_p(k)$ and $C_d(k)$ are weighting factors for pilot and data, respectively; and $\hat{H}_{overall}(k)$ is the overall channel estimate.

In general, $\hat{H}_{overall}(k)$ may be derived based on any function of $\hat{H}_{pilot}(k)$, $\hat{H}_{data}(k)$, the confidence in the reliability of the data symbol estimates, and/or other factors. The process described above may be performed in an iterative fashion. For each iteration, $\hat{H}_{overall}(k)$ is updated based on the channel estimate obtained from the data symbol estimates, and the updated $\hat{H}_{overall}(k)$ is used to derive new data symbol estimates. The data-aided channel estimation technique may be used for all pilot schemes, including the TDM and CDM pilot schemes shown in FIGS. 5A through 5D.

Figure 9:
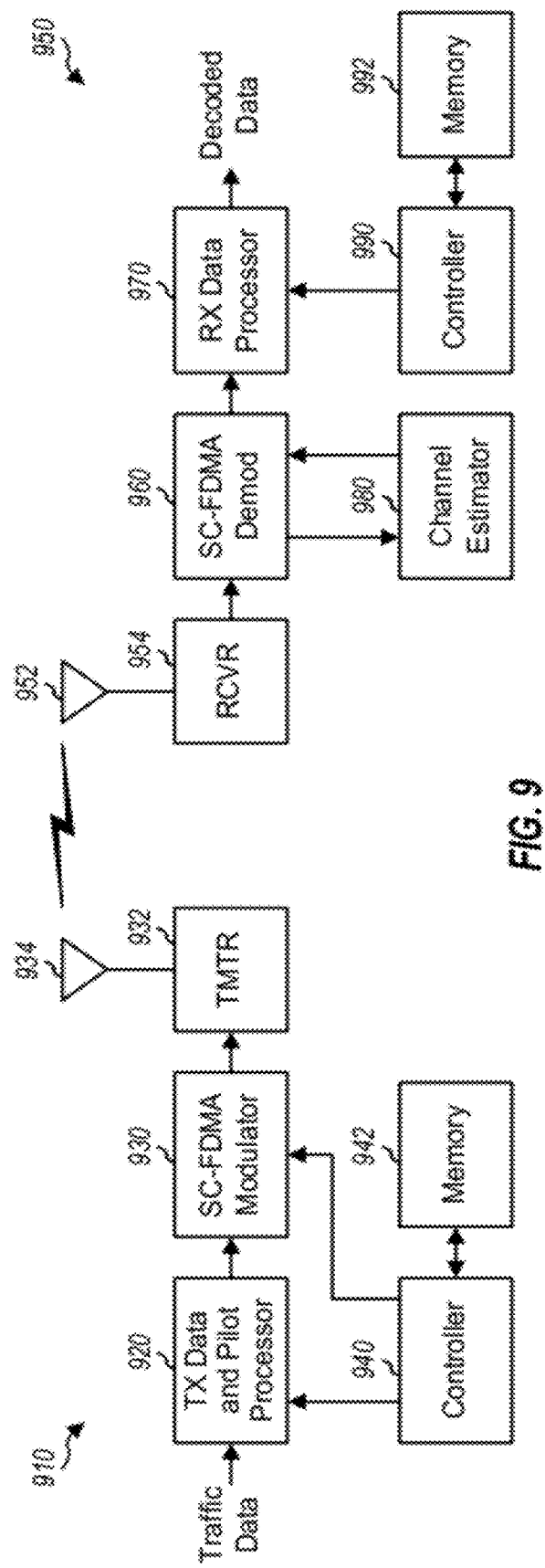
FIG. 9 shows a block diagram of a transmitter and a receiver.

FIG. 9 shows a block diagram of a transmitter 910 and a receiver 950. For the forward link, transmitter 910 is part of a base station and receiver 950 is part of a wireless device. For the reverse link, transmitter 910 is part of a wireless device and receiver 950 is part of a base station. A base station is generally a fixed station and may also be called a base transceiver system (BTS), an access point, or some other terminology. A wireless device may be fixed or mobile and may also be called a user terminal, a mobile station, or some other terminology.

At transmitter 910, a TX data and pilot processor 920 processes traffic data to obtain data symbols, generates pilot symbols, and provides the data symbols and pilot symbols. An SC-FDMA modulator 930 multiplexes the data symbols and pilot symbols using TDM and/or CDM and performs SC-FDMA modulation (e.g., for IFDMA, LFDMA, and so on) to generate SC-FDMA symbols. A transmitter unit (TMTR) 932 processes (e.g., converts to analog, amplifies, filters, and frequency upconverts) the SC-FDMA symbols and generates a radio frequency (RF) modulated signal, which is transmitted via an antenna 934.

At receiver 950, an antenna 952 receives the transmitted signal and provides a received signal. A receiver unit (RCVR) 954 conditions (e.g., filters, amplifies, frequency downconverts, and digitizes) the received signal to generate a stream of received samples. An SC-FDMA demodulator 960 processes the received samples and obtains received data symbols and received pilot symbols. A channel estimator/processor 980 derives a channel estimate based on the received pilot symbols. SC-FDMA demodulator 960 performs equalization on the received data symbols with the channel estimate and provides data symbol estimates. A receive (RX) data processor 970 symbol demaps, deinterleaves, and decodes the data symbol estimates and provides decoded data. In general, the processing by SC-FDMA demodulator 960 and RX data processor 970 is complementary to the processing by SC-FDMA modulator 930 and TX data and pilot processor 920, respectively, at transmitter 910.

Controllers 940 and 990 direct the operation of various processing units at transmitter 910 and receiver 950, respectively. Memory units 942 and 992 store program codes and data used by controllers 940 and 990, respectively.

Figure 10A:
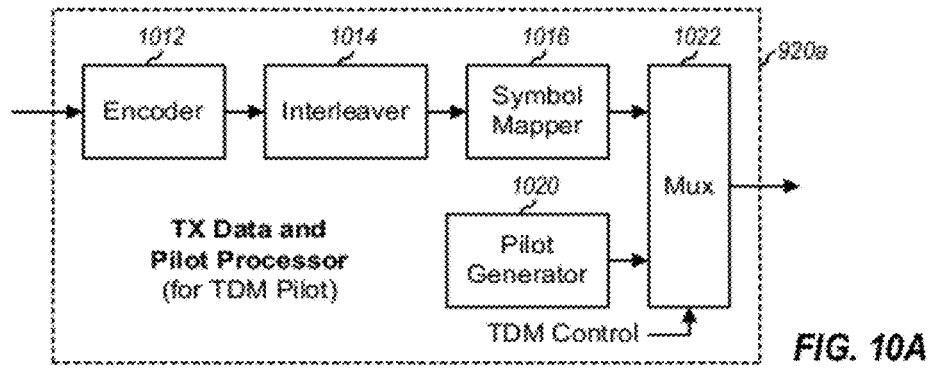
FIGS. 10A and 10B show transmit (TX) data and pilot processors for the TDM pilot schemes and the CDM pilot schemes, respectively.

FIG. 10A shows a block diagram of a TX data and pilot processor 920a, which is an embodiment of processor 920 in FIG. 9 and may be used for the TDM pilot schemes. Within processor 920a, traffic data is encoded by an encoder 1012, interleaved by an interleaver 1014, and mapped to data symbols by a symbol mapper 1016. A pilot generator 1020 generates pilot symbols, e.g., based on a polyphase sequence. A multiplexer (Mux) 1022 receives and multiplexes the data symbols with the pilot symbols based on a TDM control and provides a stream of multiplexed data and pilot symbols.

Figure 10B:
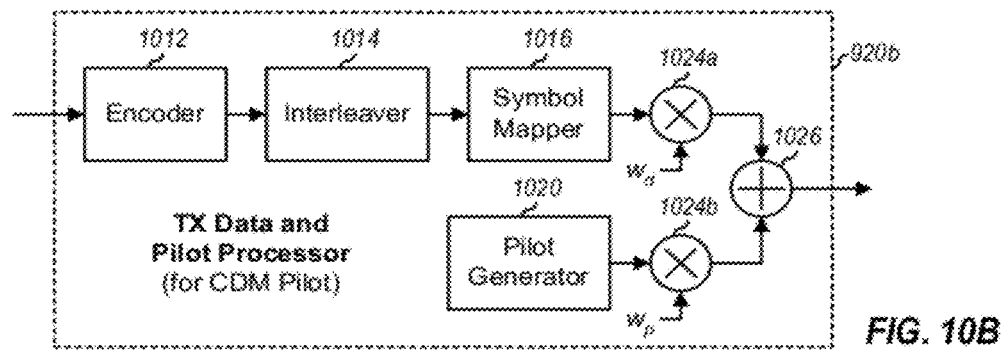

FIG. 10B shows a block diagram of a TX data and pilot processor 920b, which is another embodiment of processor 920 in FIG. 9 and may be used for the CDM pilot schemes. Within processor 920b, traffic data is encoded by encoder 1012, interleaved by interleaver 1014, and mapped to data symbols by symbol mapper 1016. A multiplier 1024a multiplies each data symbol with the M chips of the orthogonal sequence $\{w_d\}$ for data and provides M scaled data symbols. Similarly, a multiplier 1024b multiplies each pilot symbol with the M chips of the orthogonal sequence $\{w_p\}$ for pilot and provides M scaled pilot symbols. A summer 1026 sums the scaled data symbols with the scaled pilot symbols, e.g., as shown in FIG. 5C or 5D, and provides combined symbols.

Figure 11A:
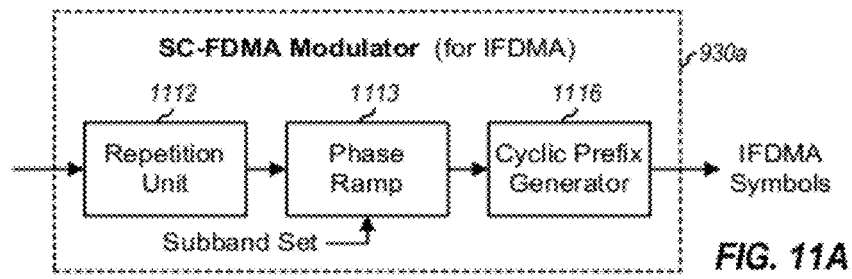
FIGS. 11A and 11B show IFDMA and LFDMA modulators, respectively.

FIG. 11A shows an SC-FDMA modulator 930a for IFDMA, which is an embodiment of SC-FDMA modulator 930 in FIG. 9. Within modulator 930a, a repetition unit 1112 repeats an original sequence of data/pilot symbols S times to obtain an extended sequence of K symbols. A phase ramp unit 1114 applies a phase ramp to the extended symbol sequence to generate a frequency-translated sequence of output symbols. The phase ramp is determined by the subband set u used for transmission. A cyclic prefix generator 1116 appends a cyclic prefix to the frequency-translated symbol sequence to generate an IFDMA symbol.

Figure 11B:
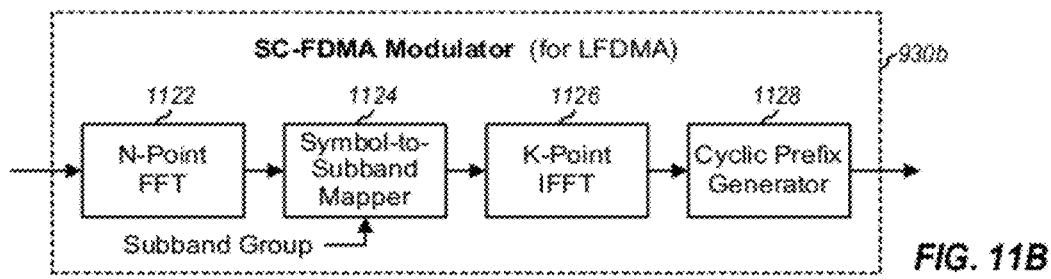

FIG. 11B shows an SC-FDMA modulator 930b for LFDMA, which is another embodiment of SC-FDMA modulator 930 in FIG. 9. Within modulator 930b, an FFT unit 1122 performs an N-point FFT on an original sequence of data/pilot symbols to obtain a sequence of N frequency-domain symbols. A symbol-to-subband-mapper 1124 maps the N frequency-domain symbols onto the N subbands used for transmission and maps K−N zero symbols onto the remaining K−N subbands. An IFFT unit 1126 performs a K-point IFFT on the K symbols from mapper 1124 and provides a sequence of K time-domain output symbols. A cyclic prefix generator 1128 appends a cyclic prefix to the output symbol sequence to generate an LFDMA symbol.

Figure 12A:
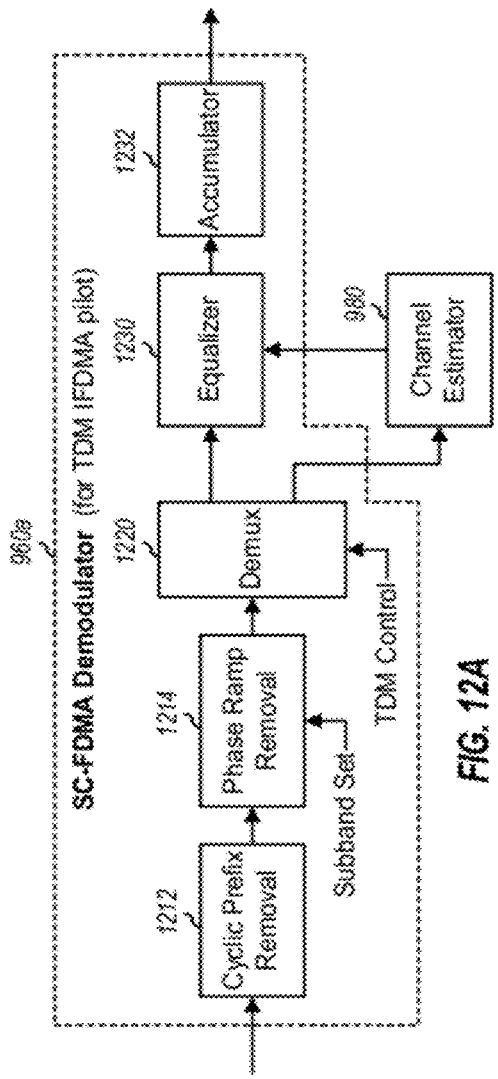
FIGS. 12A and 12B show IFDMA demodulators for TDM and CDM pilots, respectively.

FIG. 12A shows a block diagram of an SC-FDMA demodulator 960a, which is an embodiment of demodulator 960 in FIG. 9 and may be used for the TDM IFDMA pilot schemes. Within SC-FDMA demodulator 960a, a cyclic prefix removal unit 1212 removes the cyclic prefix for each received IFDMA symbol. A phase ramp removal unit 1214 removes the phase ramp in each received IFDMA symbol. The phase ramp removal may also be performed by the frequency downconversion from RF to baseband. A demultiplexer (Demux) 1220 receives the output of unit 1214, and provides received data symbols to an equalizer 1230, and provides received pilot symbols to channel estimator 980. Channel estimator 980 derives a channel estimate based on the received pilot symbols, e.g., using the MMSE or least-squares technique. Equalizer 1230 performs equalization on the received data symbols with the channel estimate in the time domain or the frequency domain and provides equalized data symbols. An accumulator 1232 accumulates equalized data symbols corresponding to multiple copies of the same transmitted data symbol and provides data symbol estimates.

Figure 12B:
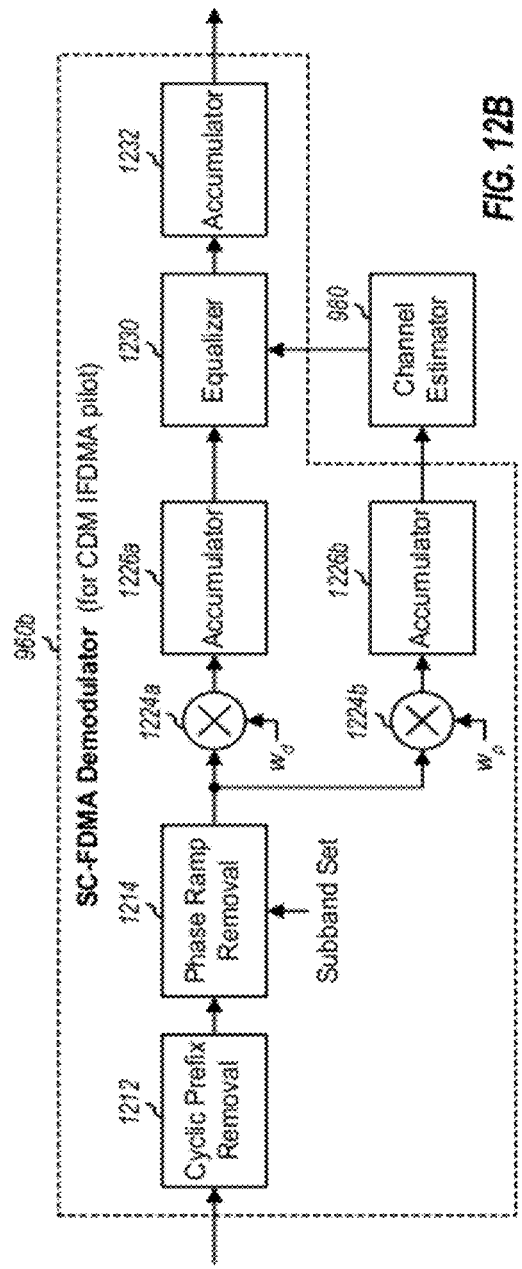

FIG. 12B shows a block diagram of an SC-FDMA demodulator 960b, which is another embodiment of demodulator 960 in FIG. 9 and may be used for the CDM IFDMA pilot schemes. SC-FDMA demodulator 960b includes a data channelizer that recovers the transmitted data symbols and a pilot channelizer that recovers the transmitted pilot symbols. For the data channelizer, a multiplier 1224a multiplies the output of unit 1214 with the M chips of the data orthogonal sequence $\{w_d\}$ and provides scaled data symbols. An accumulator 1226a accumulates M scaled data symbols for each transmitted data symbol and provides a received data symbol. For the pilot channelizer, a multiplier 1224b multiplies the output of unit 1214 with the M chips of the pilot orthogonal sequence $\{w_p\}$ and provides M scaled pilot symbols for each transmitted pilot symbol, which are accumulated by an accumulator 1226b to obtain a received pilot symbol for the transmitted pilot symbol. The processing by subsequent units within SC-FDMA demodulator 960b is as described above for SC-FDMA demodulator 960a.

Figure 13A:
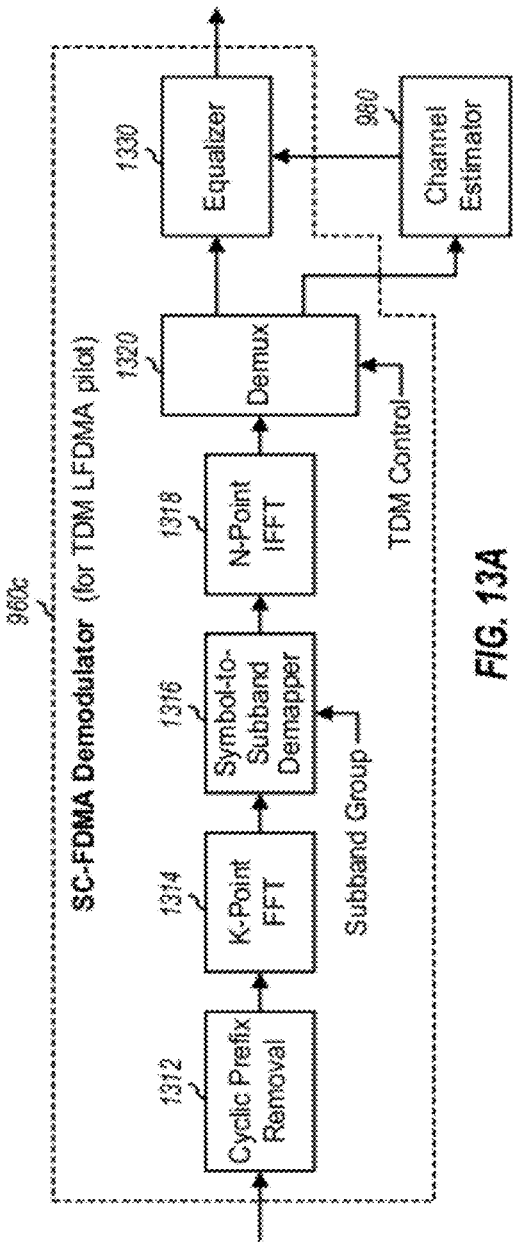
FIGS. 13A and 13B show LFDMA demodulators for TDM and CDM pilots, respectively.

FIG. 13A shows a block diagram of an SC-FDMA demodulator 960c, which is yet another embodiment of demodulator 960 in FIG. 9 and may be used for the TDM LFDMA pilot schemes. Within SC-FDMA demodulator 960c, a cyclic prefix removal unit 1312 removes the cyclic prefix for each received LFDMA symbol. An FFT unit 1314 performs a K-point FFT on an LFDMA symbol after removal of the cyclic prefix and provides K frequency-domain values. A subband-to-symbol demapper 1316 receives the K frequency-domain values, provides N frequency-domain values for the N subbands used for transmission, and discards the remaining frequency-domain values. An IFFT unit 1318 performs an N-point FFT on the N frequency-domain values from demapper 1316 and provides N received symbols. A demultiplexer 1320 receives the output of unit 1318, provides received data symbols to an equalizer 1330, and provides received pilot symbols to channel estimator 980. Equalizer 1330 performs equalization on the received data symbols in the time domain or the frequency domain with a channel estimate from channel estimator 980 and provides data symbol estimates.

Figure 13B:
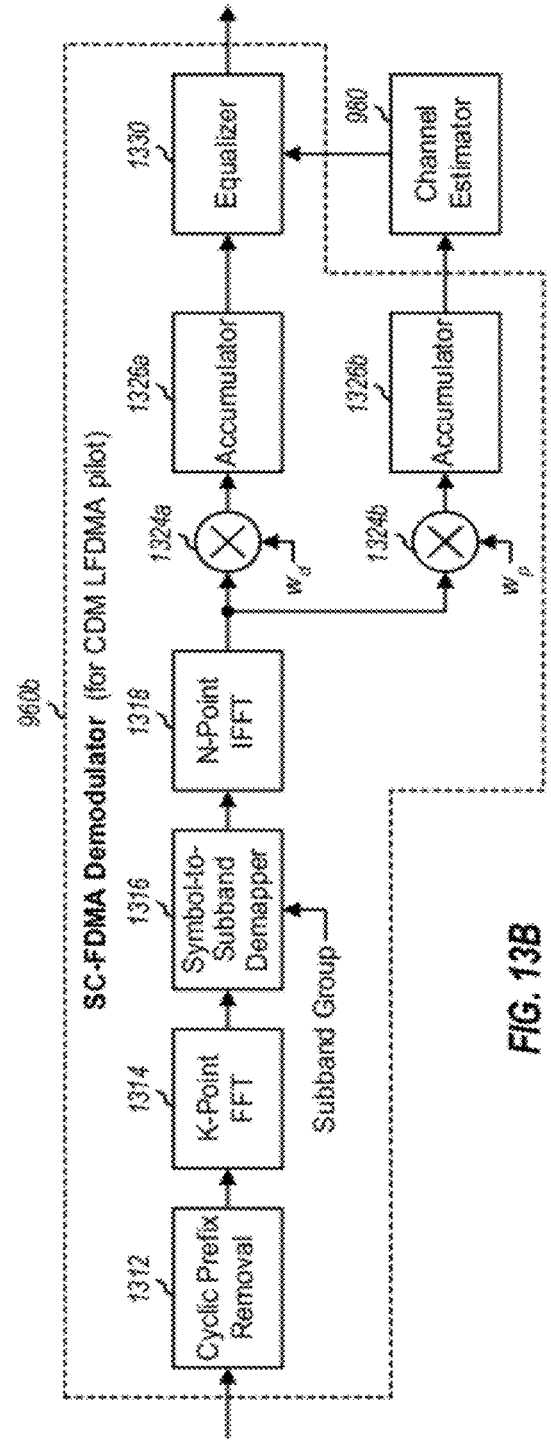

FIG. 13B shows a block diagram of an SC-FDMA demodulator 960d, which is yet another embodiment of demodulator 960 in FIG. 9 and may be used for the CDM LFDMA pilot schemes. SC-FDMA demodulator 960d includes a data channelizer that recovers the transmitted data symbols and a pilot channelizer that recovers the transmitted pilot symbols. For the data channelizer, a multiplier 1324a multiplies the output of IFFT unit 1318 with the M chips of the data orthogonal sequence $\{w_d\}$ and provides scaled data symbols. An accumulator 1326a accumulates M scaled data symbols for each transmitted data symbol and provides a received data symbol. For the pilot channelizer, a multiplier 1324b multiplies the output of IFFT unit 1318 with the M chips of the pilot orthogonal sequence $\{w_p\}$ and provides M scaled pilot symbols for each transmitted pilot symbol, which are accumulated by an accumulator 1326b to obtain a received pilot symbol for the transmitted pilot symbol. The processing by subsequent units within SC-FDMA demodulator 960d is as described above for SC-FDMA demodulator 960c.

The pilot transmission and channel estimation techniques described herein may be implemented by various means. For example, these techniques may be implemented in hardware, software, or a combination thereof. For a hardware implementation, the processing units used to generate and transmit a pilot at a transmitter (e.g., each of the processing units shown in FIGS. 9 through 13B, or a combination of the processing units) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to perform channel estimation at a receiver may also be implemented within one or more ASICs, DSPs, electronic devices, and so on.

For a software implementation, the techniques may be implemented with modules (e.g., procedures, functions, and so on) that perform the functions described herein. The software codes may be stored in a memory unit (e.g., memory unit 942 or 992 in FIG. 9) and executed by a processor (e.g., controller 940 or 990). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wireless communication, comprising:
   at least one demodulator configured to receive at least one single-carrier frequency division multiple access (SC-FDMA) symbol via a communication channel, to remove a cyclic prefix in each of the at least one SC-FDMA symbol, to demodulate the at least one SC-FDMA symbol to obtain received symbols, and to time division demultiplex the received symbols to obtain received pilot symbols and received data symbols; and
   at least one processor configured to process the received data symbols based on the received pilot symbols to obtain data symbol estimates.

2. The apparatus of claim 1, wherein the received data symbols are for a data transmission, and wherein the received pilot symbols are for a pilot having a wider bandwidth than the data transmission.

3. The apparatus of claim 1, wherein the at least one processor is configured to process the received pilot symbols based on a pseudo-random number (PN) sequence to obtain a channel estimate.

4. The apparatus of claim 1, wherein the at least one processor is configured to process the received pilot symbols based on a polyphase sequence to obtain a channel estimate.

5. The apparatus of claim 1, wherein the at least one demodulator is configured to receive at least one localized FDMA (LFDMA) symbol for the at least one SC-FDMA symbol.

6. The apparatus of claim 1, wherein the at least one demodulator is configured to obtain the received pilot symbols from a set of contiguous subcarriers among a plurality of subcarriers available for transmission.

7. The apparatus of claim 1, wherein the at least one demodulator is configured to obtain the received pilot symbols from a set of non-contiguous subcarriers among a plurality of subcarriers available for transmission.

8. The apparatus of claim 1, wherein the at least one demodulator is configured to obtain the received pilot symbols from a configurable number of subcarriers among a plurality of subcarriers available for transmission.

9. The apparatus of claim 1, wherein the at least one demodulator is configured to obtain the received pilot symbols from a plurality of sets of subcarriers in a plurality of symbol periods with frequency hopping.

10. The apparatus of claim 1, wherein the at least one demodulator is configured to time division demultiplex the received symbols by obtaining the received pilot symbols in a first symbol period and obtaining the received data symbols in a second symbol period.

11. The apparatus of claim 1, wherein the at least one demodulator is configured to obtain the received pilot symbols and the received data symbols in different sample periods of a symbol period.

12. The apparatus of claim 1, wherein the at least one demodulator is configured to despread the received symbols with an orthogonal sequence to obtain the received pilot symbols.

13. The apparatus of claim 1, wherein the at least one demodulator is configured to despread the received symbols with an orthogonal sequence to obtain the received data symbols.

14. A method for wireless communication, comprising:
receiving at least one single-carrier frequency division multiple access (SC-FDMA) symbol via a communication channel;
removing a cyclic prefix in each of the at least one SC-FDMA symbol;
demodulating the at least one SC-FDMA symbol to obtain received symbols;
time division demultiplexing the received symbols to obtain received pilot symbols and received data symbols; and
processing the received data symbols based on the received pilot symbols to obtain data symbol estimates.

15. The method of claim 14, further comprising:
processing the received pilot symbols based on a pseudo-random number (PN) sequence or a polyphase sequence to obtain a channel estimate.

16. The method of claim 14, further comprising:
obtaining the received pilot symbols from a plurality of sets of subcarriers in a plurality of symbol periods with frequency hopping.

17. The method of claim 14, wherein the time division demultiplexing the received symbols comprises:
obtaining the received pilot symbols in a first symbol period; and
obtaining the received data symbols in a second symbol period.

18. The method of claim 14, further comprising:
despreading the received symbols with an orthogonal sequence to obtain the received pilot symbols.

19. An apparatus for wireless communication, comprising:
means for receiving at least one single-carrier frequency division multiple access (SC-FDMA) symbol via a communication channel;
means for removing a cyclic prefix in each of the at least one SC-FDMA symbol;
means for demodulating the at least one SC-FDMA symbol to obtain received symbols;
means for time division demultiplexing the received symbols to obtain received pilot symbols and received data symbols; and
means for processing the received data symbols based on the received pilot symbols to obtain data symbol estimates.

20. The apparatus of claim 19, further comprising:
means for processing the received pilot symbols based on a pseudo-random number (PN) sequence or a polyphase sequence to obtain a channel estimate.

21. The apparatus of claim 19, further comprising:
means for obtaining the received pilot symbols from a plurality of sets of subcarriers in a plurality of symbol periods with frequency hopping.

22. The apparatus of claim 19, wherein the means for time division demultiplexing the received symbols comprises:
means for obtaining the received pilot symbols in a first symbol period; and
means for obtaining the received data symbols in a second symbol period.

23. The apparatus of claim 19, further comprising:
means for despreading the received symbols with an orthogonal sequence to obtain the received pilot symbols.

24. A non-transitory computer-readable medium comprising:
code for causing at least one processor to receive at least one single-carrier frequency division multiple access (SC-FDMA) symbol via a communication channel;
code for causing the at least one processor to remove a cyclic prefix in each of the at least one SC-FDMA symbol;
code for causing the at least one processor to demodulate the at least one SC-FDMA symbol to obtain received symbols;
code for causing the at least one processor to time division demultiplex the received symbols to obtain received pilot symbols and received data symbols; and
code for causing the at least one processor to process the received data symbols based on the received pilot symbols to obtain data symbol estimates.

\* \* \* \* \*